United States Patent
Stevens et al.

(10) Patent No.: US 10,804,751 B2
(45) Date of Patent: *Oct. 13, 2020

(54) CONTROLLING INDUCTIVE POWER TRANSFER SYSTEMS

(71) Applicant: Philips IP Ventures B.V., Eindhoven (NL)

(72) Inventors: Michael Craig Stevens, Cambridge (GB); Alexander Charles Knill, Devon (GB); John Robert Dunton, Suffolk (GB); Julian Andrew John Fells, West Sussex (GB)

(73) Assignee: Philips I.P. Ventures B.V., Eindhoven (NL)

( * ) Notice: Subject to any disclaimer, the term of this patent is extended or adjusted under 35 U.S.C. 154(b) by 82 days.

This patent is subject to a terminal disclaimer.

(21) Appl. No.: 16/117,755

(22) Filed: Aug. 30, 2018

(65) Prior Publication Data

US 2018/0375389 A1    Dec. 27, 2018

Related U.S. Application Data

(63) Continuation of application No. 15/083,955, filed on Mar. 29, 2016, now Pat. No. 10,069,350, which is a (Continued)

(30) Foreign Application Priority Data

May 11, 2004 (GB) .................................. 0410503.7
Feb. 10, 2005 (GB) .................................. 0502775.0

(51) Int. Cl.
*H02J 50/80* (2016.01)
*G05F 1/66* (2006.01)
(Continued)

(52) U.S. Cl.
CPC ................ *H02J 50/80* (2016.02); *G05F 1/66* (2013.01); *H01F 38/14* (2013.01); *H02J 50/10* (2016.02);
(Continued)

(58) Field of Classification Search
CPC .. H02J 5/005; H02J 7/025; H02J 17/00; H02J 50/80; H02J 50/10; H02J 50/12;
(Continued)

(56) References Cited

U.S. PATENT DOCUMENTS 4,654,573 A   3/1987 Rough et al.
5,734,254 A   3/1998 Stephens
(Continued)

FOREIGN PATENT DOCUMENTS

DE   197 41 279   9/1997
EP   0 533 247    3/1993
(Continued)

OTHER PUBLICATIONS

Search Report issued in PCT International Application No. PCT/GB2005/001824, dated Nov. 23, 2006.
(Continued)

*Primary Examiner* — Carlos Amaya

(57) ABSTRACT

An inductive power transfer system comprises a primary unit operable to generate an electromagnetic field and at least one secondary device, separable from the primary unit, and adapted to couple with the field when the secondary device is in proximity to the primary unit so that power can be received inductively by the secondary device from the primary unit without direct electrical conductive contacts therebetween. The system detects if there is a substantial difference between, on the one hand, a power drawn from the primary unit and, on the other hand, a power required by the secondary device or, if there is more than one secondary (Continued)

device, a combined power required by the secondary devices. Following such detection, the system restricts or stops the inductive power supply from the primary unit. Such a system can detect the presence of unwanted parasitic loads in the vicinity of the primary unit reliably.

20 Claims, 11 Drawing Sheets

Related U.S. Application Data continuation of application No. 13/927,173, filed on Jun. 26, 2013, now Pat. No. 9,331,526, which is a continuation of application No. 13/236,066, filed on Sep. 19, 2011, now Pat. No. 8,508,077, which is a continuation of application No. 12/556,121, filed on Sep. 9, 2009, now Pat. No. 8,039,995, which is a continuation of application No. 11/569,035, filed as application No. PCT/GB2005/001824 on May 11, 2005, now Pat. No. 7,605,496.

(51) Int. Cl.
*H01F 38/14* (2006.01)
*H02J 50/10* (2016.01)
*H02J 50/12* (2016.01)
*H02J 50/60* (2016.01)

(52) U.S. Cl.
CPC .............. *H02J 50/12* (2016.02); *H02J 50/60* (2016.02); *Y10T 307/297* (2015.04); *Y10T 307/406* (2015.04); *Y10T 307/511* (2015.04)

(58) Field of Classification Search
CPC .. H02J 50/60; G05F 1/66; H01F 38/14; Y10T 307/297; Y10T 307/406; Y10T 307/511
See application file for complete search history.

(56) References Cited

U.S. PATENT DOCUMENTS

| | | | |
|---|---|---|---|
| 6,028,413 | A | 2/2000 | Brockmann |
| 6,040,986 | A | 3/2000 | Sakamoto et al. |
| 6,057,668 | A | 5/2000 | Chao |
| 6,118,249 | A | 9/2000 | Brockmann et al. |
| 10,069,350 | B2 * | 9/2018 | Stevens .................. H01F 38/14 |
| 2002/0154518 | A1 | 10/2002 | Elferich et al. |
| 2002/0158512 | A1 | 10/2002 | Mizutani et al. |
| 2004/0130916 | A1 | 7/2004 | Baarman |
| 2004/0145342 | A1 | 7/2004 | Lyon |
| 2005/0068019 | A1 | 3/2005 | Nakamura et al. |
| 2007/0228833 | A1 | 10/2007 | Stevens et al. |

FOREIGN PATENT DOCUMENTS

| | | |
|---|---|---|
| EP | 0 903 830 | 3/1999 |
| EP | 2 017 940 | 1/2009 |
| JP | H09-103037 | 4/1997 |
| JP | H10-215530 | 8/1998 |
| JP | 2000-295796 | 10/2000 |
| JP | 2001-275280 | 10/2001 |
| JP | 2001-275282 | 9/2003 |
| JP | 2003-264934 | 9/2003 |
| WO | 2004/015885 | 2/2004 |
| WO | 2005/031944 | 4/2005 |
| WO | 2009/081115 | 7/2009 |

OTHER PUBLICATIONS

Response to European Office Action in counterpart European patent application, dated Nov. 14, 2007.

* cited by examiner

CONTROLLING INDUCTIVE POWER TRANSFER SYSTEMS

CROSS-REFERENCE TO PRIOR APPLICATIONS

This application is a continuation of U.S. application Ser. No. 15/083,955, filed on Mar. 29, 2016, which is a continuation of U.S. application Ser. No. 13/927,173, filed on Jun. 26, 2013, which is a continuation of U.S. application Ser. No. 13/236,066, filed on Sep. 19, 2011, which is a continuation of U.S. application Ser. No. 12/556,121, filed on Sep. 9, 2009, which claims the benefit of U.S. National Phase application Ser. No. 11/569,035, filed on Nov. 13, 2006, which claims the benefit of International Application Ser. No. PCT/GB2005/001824 filed on May 11, 2005, which claims the benefit of British Application No. 0410503.7, filed May 11, 2004 and British Application No. 0502775.0, filed Feb. 10, 2005. These applications are hereby incorporated by reference herein.

FIELD OF INVENTION

The present invention relates to controlling inductive power transfer systems for use, for example, to power portable electrical or electronic devices.

BACKGROUND

Inductive power transfer systems suitable for powering portable devices may consist of two parts:
  A primary unit having at least one primary coil, through which it drives an alternating current, creating a time-varying magnetic flux.
  A secondary device, separable from the primary unit, containing a secondary coil. When the secondary coil is placed in proximity to the time-varying flux created by the primary coil, the varying flux induces an alternating current in the secondary coil, and thus power may be transferred inductively from the primary unit to the secondary device.

Generally, the secondary device supplies the transferred power to an external load, and the secondary device may be carried in or by a host object which includes the load. For example the host object may be a portable electrical or electronic device having a rechargeable battery or cell. In this case the load may be a battery charger circuit for charging the battery or cell. Alternatively, the secondary device may be incorporated in such a rechargeable cell or battery, together with a suitable battery charger circuit.

A class of such an inductive power transfer systems is described in our United Kingdom patent publication GB-A-2388716. A notable characteristic of this class of systems is the physically "open" nature of the magnetic system of the primary unit—a significant part of the magnetic path is through air. This is necessary in order that the primary unit can supply power to different shapes and sizes of secondary device, and to multiple secondary devices simultaneously. Another example of such an "open" system is described in GB-A-2389720.

Such systems may suffer from some problems. A first problem is that the primary unit cannot be 100% efficient. For example, switching losses in the electronics and $I^2R$ losses in the primary coil dissipate power even when there is no secondary device present, or when no secondary devices that are present require charge. This wastes energy. Preferably the primary unit should enter a low-power "standby mode" in this situation.

A second problem in such systems is that it is not possible to mechanically prevent foreign objects from being placed into proximity with the primary coil, coupling to the coil. Foreign objects made of metal will have eddy-currents induced therein. These eddy currents tend to act to exclude the flux, but because the material has resistance, the flowing eddy currents will suffer $I^2R$ losses which will cause heating of the object. There are two particular cases where this heating may be significant:
  If the resistance of any metal is high, for example if it is impure or thin.
  If the material is ferromagnetic, for example steel. Such materials have high permeability, encouraging a high flux density within the material, causing large eddy currents and therefore large $I^2R$ losses.

In the present application, such foreign objects that cause power drain are termed "parasitic loads". Preferably the primary unit should enter a "shutdown mode" when parasitic loads are present, to avoid heating them.

Various approaches to solve these two problems have been proposed in the prior art.

Solutions to the first problem, of not wasting power when no secondary device requires charge, include:
  In EP0533247 and U.S. Pat. No. 6,118,249 the secondary device modulates its inductive load during charging, causing a corresponding variation in the power taken from the primary unit. This indicates to the primary unit that it should stay out of the standby state.
  In EP1022840 the primary unit varies the frequency of its drive, and thus the coupling factor to a tuned secondary unit. If the secondary unit is not taking power, there is no difference in the power taken as the frequency is swept and thus the primary unit goes into a standby state.
  In U.S. Pat. No. 5,536,979 the primary unit simply measures the power flowing in the primary coil, and enters a pulsing standby state if this is below a threshold.
  In U.S. Pat. No. 5,896,278 the primary unit contains detecting coils which have power coupled back into them according to the position of the secondary device. If the device is not present the primary unit enters a standby mode.
  In U.S. Pat. No. 5,952,814 the secondary device has a mechanical protrusion which fits a slot in the primary unit, activating it.
  In U.S. Pat. No. 6,028,413 the primary unit drives two coils, and there are a corresponding two power receiving secondary coils in the secondary unit. The primary unit measures the power delivered from each primary coil and enters standby mode if it is below a threshold.

Solutions to the second problem, of parasitic loads, include:
  As mentioned above, in EP1022840 the primary unit varies the frequency of its drive. In this system, the secondary device is tuned, so this frequency variation will result in a variation of the power taken from the primary unit. If the load is instead a piece of metal, then varying the frequency will not have as much effect and the primary unit will enter a shutdown state.
  As mentioned above, in U.S. Pat. No. 5,952,814 a key in the secondary device activates the primary unit. The assumption is that if a secondary device is present then this will physically exclude any foreign objects.

As mentioned above, in U.S. Pat. No. 6,028,413 the primary unit supplies power to the secondary device by driving two primary coils. If the amount of power supplied by the two coils is different, the primary unit assumes that the load is not a valid secondary device and enters shutdown mode.

These approaches all assume a 1:1 relationship between the primary unit and the secondary device. Therefore they are not sufficient for systems such as those described in GB-A-2388716 where more than one secondary device at a time may be present. For example, they would not work when there are two secondary devices present, one requiring charge and the other not.

Some of these approaches also assume that the physical or electrical presence of a valid secondary device implies that all foreign objects are physically excluded by the secondary device. This is not necessarily the case, particularly when the secondary devices may be positioned arbitrarily in respect of the primary unit, as in those described in GB-A-2388716.

SUMMARY

According to a first aspect of the present invention there is provided a method of controlling inductive power transfer in an inductive power transfer system comprising a primary unit operable to generate an electromagnetic field and at least one secondary device, separable from the primary unit, and adapted to couple with said field when the secondary device is in proximity to the primary unit so that power can be received inductively by the secondary device from the primary unit without direct electrical conductive contacts therebetween, which method comprises: setting the or each secondary device to a no-load state in which supply of any of the power received inductively by the secondary device to an actual load thereof is substantially prevented; and in the primary unit, measuring a power drawn from the primary unit when the or each secondary device is set into said no-load state, and restricting or stopping the inductive power supply from the primary unit in dependence upon the measured power.

Because the secondary device(s) are set into the no-load state during the power measurement, it can be detected easily from the measured power if there is a substantial parasitic load. If so, the primary unit can enter a shutdown mode. For example, the if the measured power is greater than a threshold value in the no-load state, then the power supply may be restricted or stopped.

This method is convenient because it is unnecessary for the secondary devices to communicate their power requirements to the primary unit or for the primary unit to carry out any summation of the power requirements: it is known that since the secondary devices are in the no-load state their combined power requirement is zero or at least a small value influenced by any parasitic load imposed on the primary unit by the secondary devices themselves.

According to a second aspect of the present invention there is provided a method of controlling inductive power transfer in an inductive power transfer system comprising a primary unit operable to generate an electromagnetic field and at least one secondary device, separable from the primary unit, and adapted to couple with said field when the secondary device is in proximity to the primary unit so that power can be received inductively by the secondary device from the primary unit without direct electrical conductive contacts therebetween, which method comprises: in the primary unit, receiving, from the or each secondary device that is in a power-requiring state, information relating to a power requirement of the secondary device concerned; and in the primary unit, measuring the power drawn from the primary unit when power is being supplied to the or each secondary device having the power-requiring state, and restricting or stopping the inductive power transfer from the primary unit in dependence upon the measured power and the received power requirement information.

In this case, the inductive power supply from the primary unit may be restricted or stopped in dependence upon a difference between said measured power and a sum of the respective power requirements of the secondary devices having said power-requiring state. For example, the inductive power supply may be restricted or stopped in the event that the measured power exceeds said sum by more than a threshold value.

This method has the advantage over the method of the first aspect that it does not need to set the secondary devices into the no-load state during the power measurement. Thus, power can be supplied continuously to the actual loads of the secondary devices.

Of course, in the method of the first aspect, the power measurement period can be very short, so that any interruption to the power supply to the load may be unnoticeable. If interruption of the load is a problem, it is possible to provide an energy storage means such as a capacitor in the secondary device to maintain the power supply to the actual load during the power measurement period.

In the method of the second aspect, any suitable communication method may be used to transmit the power requirement information from each secondary device to the primary unit. One preferred method for the or each secondary device to transmit its power requirement information to the primary unit is an RFID method. Alternatively, the or each secondary device may transmit its power requirement information to the primary unit by varying a load imposed by the secondary device on the primary unit.

It will be appreciated that the methods embodying the first and second aspects of the invention provide different ways of detecting if there is a substantial difference between, on the one hand, a power drawn from the primary unit and, on the other hand, a power required by the secondary device or, if there is more than one secondary device, a combined power required by the secondary devices. Following such detection, the inductive power supply from the primary unit can be restricted or stopped.

In the methods of the first and second aspects it is possible to vary a load imposed by the secondary device on the primary unit to communicate a signal or information from the secondary device to the primary unit. For example, the power requirement information needed in the second aspect may be transmitted this way.

An advantage of communicating using load variation is that it can permit two or more, or possibly all, secondary devices to supply respective items of information simultaneously to the primary unit. For example, if any secondary device requires power it may vary its load. If the primary unit detects no or no substantial overall load variation it can conclude that no secondary device requires power and hence enter a standby mode. Similarly, the primary unit will detect the sum of any load variations. If the load variation from each individual secondary device is proportional to some analog quantity to be communicated to the primary unit, for example the power requirement or parasitic load of the secondary device, then the sum of the respective analog quantities will be detected by the primary unit in the power measurement. This means that the sum can be obtained directly without the need for additional processing in the primary unit which may be time-consuming and/or costly to implement.

It may also be desirable to detect a condition for entering a standby mode in addition to detecting when to enter the shutdown mode. For example, in the method of the first aspect it is possible to restrict or stop the inductive power supply in the event that the measured power is less than a standby threshold value (different from the shutdown threshold mentioned above). Another possibility is that the or each said secondary device reports to the primary unit state information indicating whether the secondary device is in a no-power-requiring state, in which an actual load of the secondary device currently requires no power from the primary unit, or a power-requiring state in which said active load does currently require power from the primary unit. The primary unit then restricts or stops the inductive power supply therefrom in dependence upon the state information reported by the or each secondary device. For example, the primary unit may restrict or stop the inductive power transfer unless the state information reported by at least one secondary device indicates that it has said power-requiring state. Preferably, for speed of response, two or more secondary devices report their respective state information simultaneously to the primary unit. One convenient possibility, as noted above, is for the or each said secondary device to report its said state information by varying a load imposed by it on the primary unit.

In general, it is possible to carry out two or more measurements of the power drawn from the primary unit in different measurement periods. If the secondary devices are synchronised with the primary unit, then they can behave differently in one measurement period from another, so that the primary unit can detect two or more different conditions under which power restriction or stopping is appropriate.

One preferred embodiment has three measurement periods. In the first period, each secondary device turns off a dummy load. In the second period, each secondary device that requires power turns on its dummy load. The other secondary devices turn their dummy loads off. In the third period, each secondary device turns on its dummy load. The primary unit can detect from a comparison of the power measurements in the three periods whether there is a substantial parasitic load requiring shutdown or no device requiring power so that standby is appropriate.

It is also possible to vary the load during a measurement period. For example, the amplitude of the load change may be fixed but the duration may be varied to supply information.

The primary unit may have registered therein a power requirement of at least one said secondary device. In this case the power requirement information transmitted from that secondary device may simply be information identifying the secondary device. The primary unit employs the identifying information to retrieve the registered power requirement for the device. The identifying information can be a code or a type, model or serial number assigned to the secondary device. This can reduce the amount of information to be transmitted to the primary unit and also improve speed of response and reliability.

Although each secondary device that is in the power-receiving state transmits power requirement information to the primary unit in the method of the second aspect, the or each said secondary device not having the power-requiring state may also transmit such power requirement information to the primary unit, if desired. One possibility is for the power requirement information transmitted by the or each said secondary device not in said power-requiring state to be representative of a parasitic load imposed on the primary unit by the secondary device. This can then be used to make the shutdown detection more reliable. It is also possible for the power requirement information to be the sum of power requirement of the actual load and the parasitic load of the secondary device when in the power-requiring state and just the power requirement of the parasitic load when not in that state.

Generally, it is desirable for the detection of the conditions for restricting or stopping the inductive power supply to take account of any losses in the primary unit and the secondary devices. There are a number of ways of doing this.

One way is to employ, when carrying out said detection, first compensation information relating to losses in the primary unit itself so as compensate for said losses. It is possible to derive part or all of said first compensation information from measurements taken by the primary unit when it is effectively in electromagnetic isolation. The first compensation information may be stored in a calibration unit of the primary unit.

Another way is to employ, when carrying out said detection, second compensation information relating to a parasitic load imposed on the primary unit by the or each secondary device so as to compensate for said parasitic load of the or each secondary device. The or each said secondary device preferably communicates its said second compensation information directly to said primary unit or communicates to the primary unit other information from which the primary unit derives said second compensation information. The secondary device may communicate its said second compensation information or its said other information to the primary unit by varying a load imposed by it on the primary unit, as mentioned above.

A particularly convenient and efficient way is for the or each said secondary device to have a dummy load, representative of its said parasitic load, which it imposes on said primary unit to vary the load imposed by it on the primary unit.

Part or all of said first compensation information and/or part or all of said second compensation information may be information stored in the primary unit during manufacture and/or testing of the primary unit.

It may be advantageous to vary one or both of said first and second compensation information when one or more operating conditions (e.g. temperature) of the primary unit varies. A secondary device may be capable of being used either by itself or combination with another object. For example, the secondary device may be removable from a host object. If it can be powered when removed or when installed in the host object, the parasitic load of the device alone is likely to be quite different from the parasitic load of the device and host object together. To deal with this situation, the second compensation information may be varied in dependence upon whether the device is used by itself or in combination with another object.

In many implementations, the secondary devices need to operate in synchronism with primary unit. It is therefore preferable to transmit a synchronising signal from the primary unit to the or each said secondary device, or from the or each said secondary device to the primary unit, to synchronise operation of the primary unit and the or each said secondary device. This is conveniently done by modulating a drive signal applied to a primary coil in the primary unit. Frequency, amplitude or phase modulation, or a combination thereof, may be used.

Many different techniques can be used to measure the power drawn from the primary unit by the secondary devices. In one technique, the electromagnetic field is generated by a primary coil driven by an electrical drive unit, and electrical power for the drive unit is supplied from a power supply of the primary unit to a power input of the drive unit. The power drawn from the primary unit is measured by temporarily disconnecting the power supply and detecting a change at said power input during the disconnection. The change may be a voltage decay. The advantage of this technique is that there is no series resistance through which the current for drive unit passes. Such a series resistance dissipates significant power.

It is preferable to store energy in an energy storage unit such as a capacitor connected to said power input so that power can continue to be supplied to said power input whilst said power supply is disconnected.

Another way to measure the power drawn may be available if the electrical drive unit has a feedback circuit to control the current or power of the drive to the primary coil. In this case, a feedback signal in the feedback circuit may provide a measure of the power being drawn without the need to add in a power measurement unit at all.

Another way to measure the power involves causing a circuit including said primary coil to operate, during a measurement period, in an undriven resonating condition in which the application of drive signals to the primary coil is suspended so that energy stored in the circuit decays over the course of said period. One or more measures of such energy decay are then taken during said period and employed to measure said power drawn from the primary unit.

Two or more power measurements may be taken under the same conditions and the results averaged to improve accuracy.

In operation it may be desirable to set the field magnitude of the electromagnetic field to a value lower than the maximum value even in the operating mode. In the method of the second aspect the primary unit has the power requirement information from each secondary device and can therefore easily set the field magnitude in dependence upon the power required by the secondary device or, if there is more than one secondary device, the combined power required by the secondary devices. In this way a minimum power output for powering the secondary devices can be found. However, there are other ways to achieve a similar result. For example, a secondary device that is not getting enough power may modulate its load in some way. The primary unit may start operating at maximum power and reduce the power until the load modulation is detected from at least one secondary device. This enables minimum power to be determined in a simple and quick way.

According to a third aspect of the present invention there is provided an inductive power transfer system comprising: a primary unit operable to generate an electromagnetic field; at least one secondary device, separable from the primary unit, and adapted to couple with said field when the secondary device is in proximity to the primary unit so that power can be received inductively by the secondary device from the primary unit without direct electrical conductive contacts therebetween; means for detecting if there is a substantial difference between, on the one hand, a power drawn from the primary unit and, on the other hand, a power required by the secondary device or, if there is more than one secondary device, a combined power required by the secondary devices; and means operable, following such detection, to restrict or stop the inductive power supply from the primary unit.

According to a fourth aspect of the present invention there is provided a primary unit, for use in an inductive power transfer system that also has at least one secondary device separable from the primary unit, the primary unit comprising: means for generating an electromagnetic field which couples with said at least one secondary device when it is in proximity to the primary unit so that power can be received inductively by the secondary device from the primary unit without direct electrical conductive contacts therebetween; means for detecting if there is a substantial difference between, on the one hand, a power drawn from the primary unit and, on the other hand, a power required by the secondary device or, if there is more than one secondary device, a combined power required by the secondary devices; and means operable, following such detection, to restrict or stop the inductive power supply from the primary unit.

According to a fifth aspect of the present invention there is provided a secondary device, for use in an inductive power transfer system that comprises a primary unit which generates an electromagnetic field, the secondary device comprising: a secondary coil adapted to couple with said field generated by said primary unit when the secondary device is in proximity to the primary unit so that power can be received inductively by the secondary device from the primary unit without direct electrical conductive contacts therebetween; load connection means, connected to said secondary coil and adapted to be connected when the secondary device is in use to a load requiring power from the primary unit, for supplying such inductively-received power to the load; detecting means for detecting a synchronisation signal transmitted by the primary unit; and control means, responsive to the detection of the synchronisation signal, to set the secondary device into a no-load state in which supply by the load connection means of any of the inductively-received power to said load is substantially prevented.

This can provide a secondary device adapted for use in the method embodying the first aspect of the invention described above.

According to a sixth aspect of the present invention there is provided a secondary device, for use in an inductive power transfer system that comprises a primary unit which generates an electromagnetic field, the secondary device comprising: a secondary coil adapted to couple with said field generated by said primary unit when the secondary device is in proximity to the primary unit so that power can be received inductively by the secondary device from the primary unit without direct electrical conductive contacts therebetween; load connection means, connected to said secondary coil and adapted to be connected when the secondary device is in use to a load requiring power from the primary unit, for supplying such inductively-received power to the load; and RFID communication means operable to supply to the primary unit, using an RFID communication method, information relating to a power requirement of the secondary device.

This can provide a secondary device adapted for use in the method embodying the second aspect of the invention described above. In this case the load connection means does not disconnect the actual load during the power measurement.

According to a seventh aspect of the present invention there is provided a method of controlling conductive power transfer in an inductive power transfer system comprising a primary unit operable to generate an electromagnetic field and at least one secondary device, separable from primary unit, and adapted to couple with said field when the secondary device is in proximity to the primary unit so that power can be received inductively by the secondary device from the primary unit without direct electrical conductive contacts therebetween, which method comprises: in an information supplying phase, permitting two or more secondary devices to supply simultaneously to the primary unit information relating respectively to the secondary devices concerned; and interpreting the simultaneously-supplied information at the primary unit and determining based on the interpreted information whether to restrict or stop the inductive power supply from the primary unit.

This method can permit rapid supply of information or signals from the secondary devices to enable restriction or stopping of the power supply to be achieved quickly.

In one embodiment, the information supplied from each secondary device indicates whether or not the secondary device concerned is in a power-requiring state in which an actual load of the secondary device requires power from the primary unit, and the primary unit determines that the inductive power supply therefrom should be restricted or stopped unless the information supplied in said information supplying phase by at least one of the secondary devices indicates that it has said power-receiving state.

The information supplied from each secondary device may represent an analog quantity of the secondary device concerned. In this case, the primary unit can derive directly from the simultaneously-supplied information a sum of the respective analog quantities of the secondary devices.

The analog quantity may be representative of a parasitic load imposed on the primary unit by the secondary device itself.

The analog quantity may be representative of a power requirement of an actual load of the secondary device.

The analog quantity may be representative of a total load imposed on the primary unit by the secondary device, said total load including an actual load of the secondary device and a parasitic load imposed on the primary unit by the secondary device itself.

In one embodiment, each said secondary device supplies its said information by varying a load imposed by it on the primary unit. For example, each said secondary device may have a dummy load which it imposes selectively on the primary unit during said information supplying phase. The dummy load is preferably representative of said analog quantity. Different dummy loads may be used to represent different analog quantities, for example a power requirement and a parasitic load.

In one embodiment each said secondary device has its said information supplying phase at a time determined by the primary unit.

According to an eighth aspect of the present invention there is provided a method of controlling inductive power transfer in an inductive power transfer system comprising a primary unit operable to generate an electromagnetic field and at least one secondary device, separable from the primary unit, and adapted to couple with said field when the secondary device is in proximity to the primary unit so that power can be received inductively by the secondary device from the primary unit without direct electrical conductive contacts therebetween, in which method: in a reporting phase the or each said secondary device reports to the primary unit information indicating whether the secondary device is in a no-power-requiring state, in which an actual load of the secondary device currently requires no power from the primary unit, or a power-requiring state in which said active load does currently require power from the primary unit; and the primary unit determines that the inductive power supply therefrom should be restricted or stopped in dependence upon the information reported by the or each secondary device in said reporting phase.

Preferably, the or each secondary device has its said reporting phase at a time determined by the primary unit.

In one embodiment there are at least two secondary devices and each said secondary device has its said reporting phase at the same time.

The or each said secondary device may report its said information by varying a load imposed by it on the primary unit. For example, the or each said secondary device may have a dummy load which it imposes selectively on the primary unit during its said reporting phase.

In one embodiment, the or each said secondary device that has said power-requiring state imposes its said dummy load during said reporting phase and the or each said secondary device that has said non-power-requiring state does not impose its said dummy load during said reporting phase.

According to a ninth aspect of the present invention there is provided a secondary device, for use in an inductive power transfer system that comprises a primary unit which generates an electromagnetic field, the secondary device comprising: a secondary coil adapted to couple with said field generated by said primary unit when the secondary device is in proximity to the primary unit so that power can be received inductively by the secondary device from the primary unit without direct electrical conductive contacts therebetween; load connection means, connected to said secondary coil and adapted to be connected when the secondary device is in use to a load requiring power from the primary unit, for supplying such inductively-received power to the load; and communication means operable to communicate to the primary unit information relating to a parasitic load imposed on the primary unit by the secondary device.

Such a secondary device can communicate its parasitic load to the primary unit for the primary unit to use to compensate for that load. For example, the communicated parasitic load can be used when detecting conditions for restricting or stopping inductive power transfer from the primary unit.

Any communication method can be used, and the method is not limited to load variation. For example, infrared or ultrasonic communication can be used. RFID can also be used.

In one embodiment, said communication means are operable to communicate said information by imposing a dummy load on said primary unit. The communication means may be operable to impose a first dummy load on the primary unit at a first time and a second dummy load, different from said first dummy load, at a second time, a difference between said first and second dummy loads being set in dependence upon said parasitic load. One of said first and second dummy loads may be zero.

According to a tenth aspect of the present invention there is provided a portable electrical or electronic device comprising: a load which at least at times requires power from said primary unit; and a secondary device embodying the aforesaid fifth, sixth or ninth aspect of the present invention, said load connection means of said secondary device being connected to said load for supplying such inductively-received power to the load at said times.

According to an eleventh aspect of the present invention there is provided a method of controlling inductive power transfer in an inductive power transfer system comprising a primary unit, having a primary coil to which electrical drive signals are applied to generate an electromagnetic field, and also comprising at least one secondary device, separable from the primary unit and having a secondary coil adapted to couple with said field when the secondary device is in proximity to the primary unit so that power can be transferred inductively from the primary unit to the secondary device without direct electrical conductive contacts therebetween, which method comprises: causing a circuit including said primary coil to operate, during a measurement period, in an undriven resonating condition in which the application of said drive signals to said primary coil is suspended so that energy stored in the circuit decays over the course of said period; taking one or more measures of such energy decay during said period; and restricting or stopping inductive power transfer from the primary unit in dependence upon said one or more energy decay measures.

Such a method can enable either or both of parasitic load and standby detection to be achieved in a robust and cost-effective manner. It is particularly advantageous in systems which may have multiple secondary devices and/or whose open magnetic nature makes it easy for parasitic objects to couple to the primary coil.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

Reference will now be made, by way of example, to the accompanying drawings in which:

FIG. 6(a) shows a frequency of an AC voltage signal applied to a primary coil; FIG. 6(b) shows a power drawn from the primary unit; FIG. 6(c) shows a state of a switch in the primary unit; and FIG. 6(d) shows the voltage across the switch in the primary unit;

DETAILED DESCRIPTION

Figure 1:
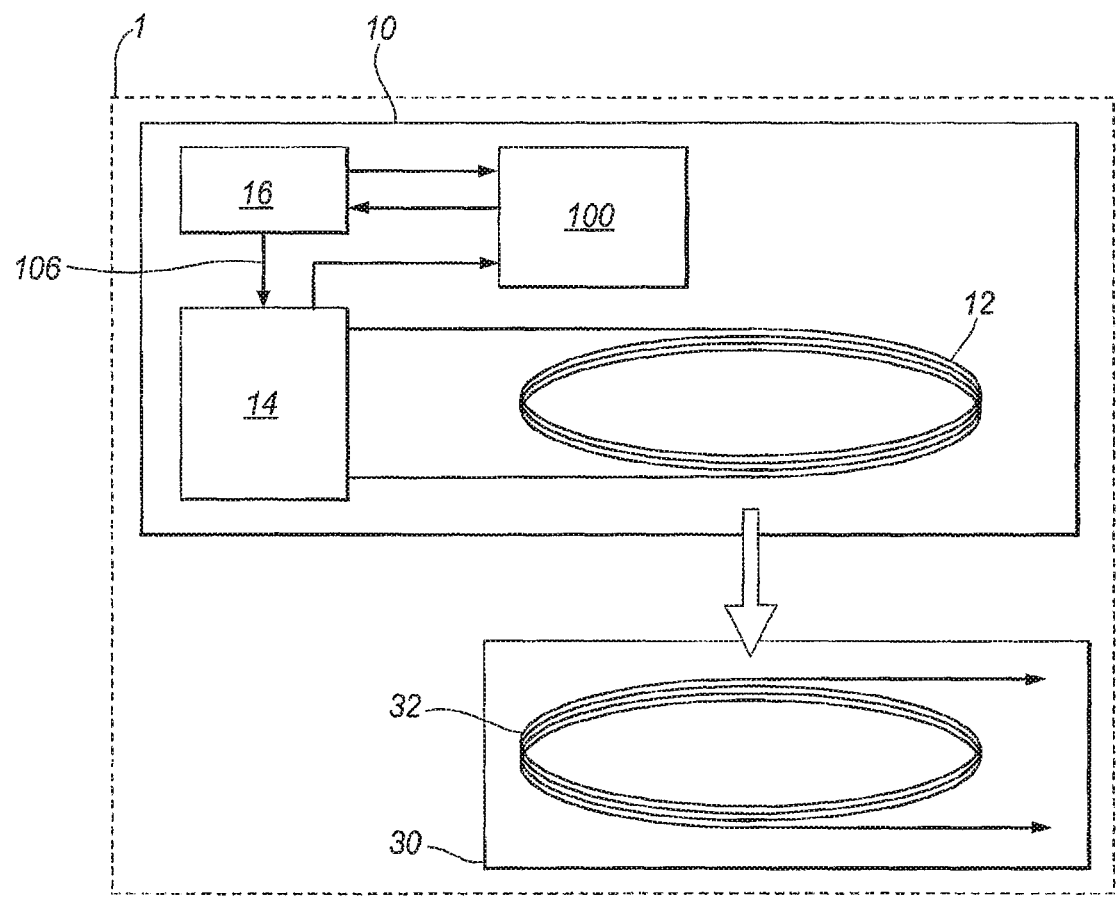
FIG. 1 is a block diagram showing parts of an inductive power transfer system embodying the present invention.

FIG. 1 illustrates parts of an inductive power transfer system embodying the present invention. The system 1 comprises a primary unit 10 and at least one secondary device 30. The primary unit 10 has a primary coil 12 and an electrical drive unit 14 connected to the primary coil 12 for applying electrical drive signals thereto so as to generate an electromagnetic field. A control unit 16 is connected to the electrical drive unit 14. This control unit generates an AC voltage signal 106. The electrical drive unit takes the AC voltage signal 106 and converts it to an AC current signal in the primary coil 12, so as to generate an induced electromagnetic field in the proximity of the primary coil 12.

The primary unit 10 may have any suitable form but one preferred form is a flat platform having a power transfer surface on or in proximity to which each secondary device 30 can be placed. In this case, the field may be distributed over a power transfer area of the surface, as described in GB-A-2388716.

The secondary device 30 is separable from the primary unit 10 and has a secondary coil 32 which couples with the electromagnetic field generated by the primary unit 10 when the secondary device 30 is in proximity to the primary unit 10. In this way, power can be transferred inductively from the primary unit 10 to the secondary device 30 without direct electrical conductive contacts therebetween.

The primary coil 12 and the secondary coils 32 can have any suitable forms, but may for example be copper wire wound around a high-permeability former such as ferrite or amorphous metal.

The secondary device 30 is usually connected to an external load (not shown—also referred to herein as the actual load of the secondary device) and supplies the inductively-received power to the external load. The secondary device 30 may be carried in or by an object requiring power such as a portable electrical or electronic device or a rechargeable battery or cell. Further information regarding designs of secondary device 30 and the objects which can be powered using the secondary devices 30 can be found in GB-A-2388716.

The primary unit 10 in the FIG. 1 system also comprises a power measurement unit 100 connected to the control unit 16. The power measurement unit 100 performs a measurement of the electrical power drawn by the electrical drive unit 14, on receipt of a signal provided by the control unit 16. The power measurement unit 100 provides an output representative of the electrical power drawn by the electrical drive unit 14 to the control unit 16. The power drawn by the electrical drive unit 14 is representative of the power drawn by the primary coil 12 and hence also the power drawn by all the secondary devices 30 plus other losses.

In the FIG. 1 system it is desirable to detect certain conditions and restrict or stop the inductive power supply from the primary unit under those conditions.

One such condition is the presence of a substantial parasitic load in the vicinity of the primary unit. In this case, the control unit 16 may enter a shutdown mode in which the drive to the primary coil 12 is reduced or stopped, preventing heating of the parasitic load.

Another such condition is when no secondary device 30 of the system is present in the vicinity of the primary unit 10. Another such condition is when there is at least one secondary device 30 present but none of the devices has a load currently requiring power. A load does not require power, for example, when turned off or when, in the case of a rechargeable battery or cell, the battery or cell is fully charged. Under both these conditions the control unit 16 may enter a standby mode in which the drive to the primary coil 12 is reduced or stopped, preventing unnecessary power consumption in the primary unit 10.

Figure 2:
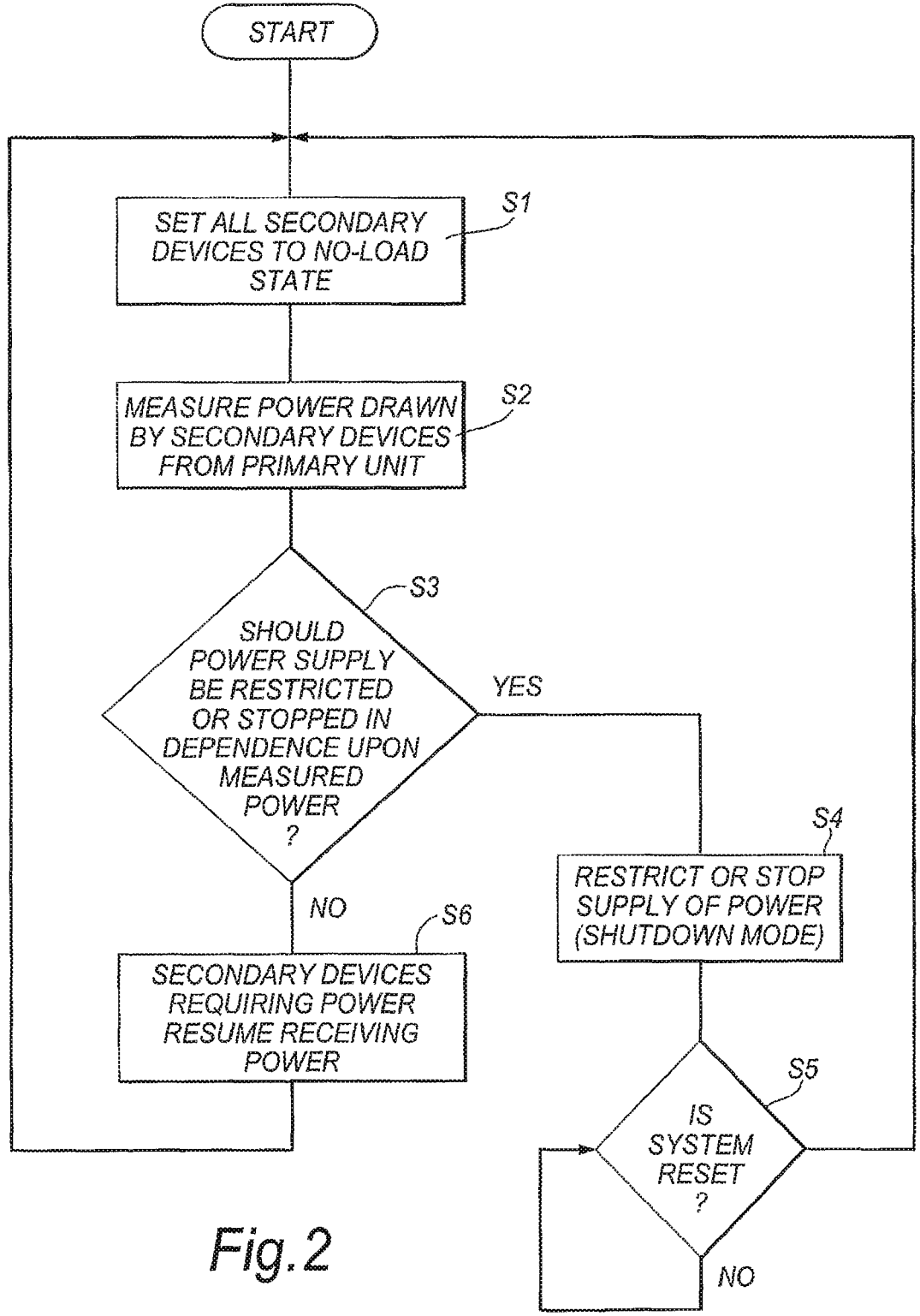
FIG. 2 is a flowchart for use in explaining a first method of detecting a shutdown condition in accordance with the present invention.

FIG. 2 is a flowchart for use in explaining a first method for detecting the presence of a substantial parasitic load in the vicinity of the primary unit in accordance with the present invention.

In this first method, when the system of FIG. 1 is in use, from time to time all of the secondary devices in the vicinity of the primary unit are deliberately set to a no-load state. In this no-load state, supply of any of the power received inductively by the secondary device to an actual load thereof (the external load mentioned above) is prevented.

In step S2, with all of the secondary devices in the no-load state, the power measurement unit 100 in the primary unit measures the power drawn by the secondary devices from the primary unit. In step S3, the control unit 16 in the primary unit determines, in dependence upon the power measured in step S2, whether to restrict or stop the inductive power supply from the primary unit.

In the simplest case, in step S3 the control unit 16 simply compares the measured power with a predetermined shutdown threshold. If the measured power exceeds the shutdown threshold value, the control unit 16 determines that the inductive power supply from the primary unit should be restricted or stopped. As described in more detail below, however, it is preferable to take into account losses which inevitably occur in the power transfer system. In particular, these losses include losses in the primary unit itself and/or any secondary devices/host objects present. These losses include inefficiencies in the primary coil itself and any other components associated with the primary coil such as the electrical drive unit, for example $I^2R$ losses in the copper of the coil or effective series resistance of any resonating capacitor. The losses also include any magnetic losses in the primary unit and the secondary devices, for example magnetic is hysteretic loop losses in any coils associated with the primary unit and/or secondary devices. According, the control unit 16 may employ, in addition to the measured power, first compensation information relating to losses in the primary unit itself, so as to compensate for those losses in step S3. Alternatively, or in addition, the control unit 16 may employ, in addition to the measured power, second compensation information relating to a parasitic load imposed on the primary unit by the or each secondary device, so as to compensate for the parasitic load of the or each secondary device in step S3.

If it is determined in step S3 that the power supply should be restricted or stopped, then in step S4 the control unit 16 places the primary unit in a shutdown mode in which the inductive power supply from the primary unit is restricted or stopped.

The primary unit will remain in the shutdown mode until it is reset in some way. Such a reset could be manually initiated by a user of the primary unit, or alternatively the control unit 16 could periodically start to supply inductive power again and repeat steps S1 to S3 to determine whether to remain in the shutdown mode or not.

In step S3, if the control unit 16 determines that the power supply does not need to be restricted or stopped, then in step S6 secondary devices requiring power resume receiving power from the primary unit. Processing then returns, for example after a predetermined interval, to step S1 again.

Next, a first method of detecting the conditions for entering the standby mode will be described with reference to FIG. 3.

Figure 3:
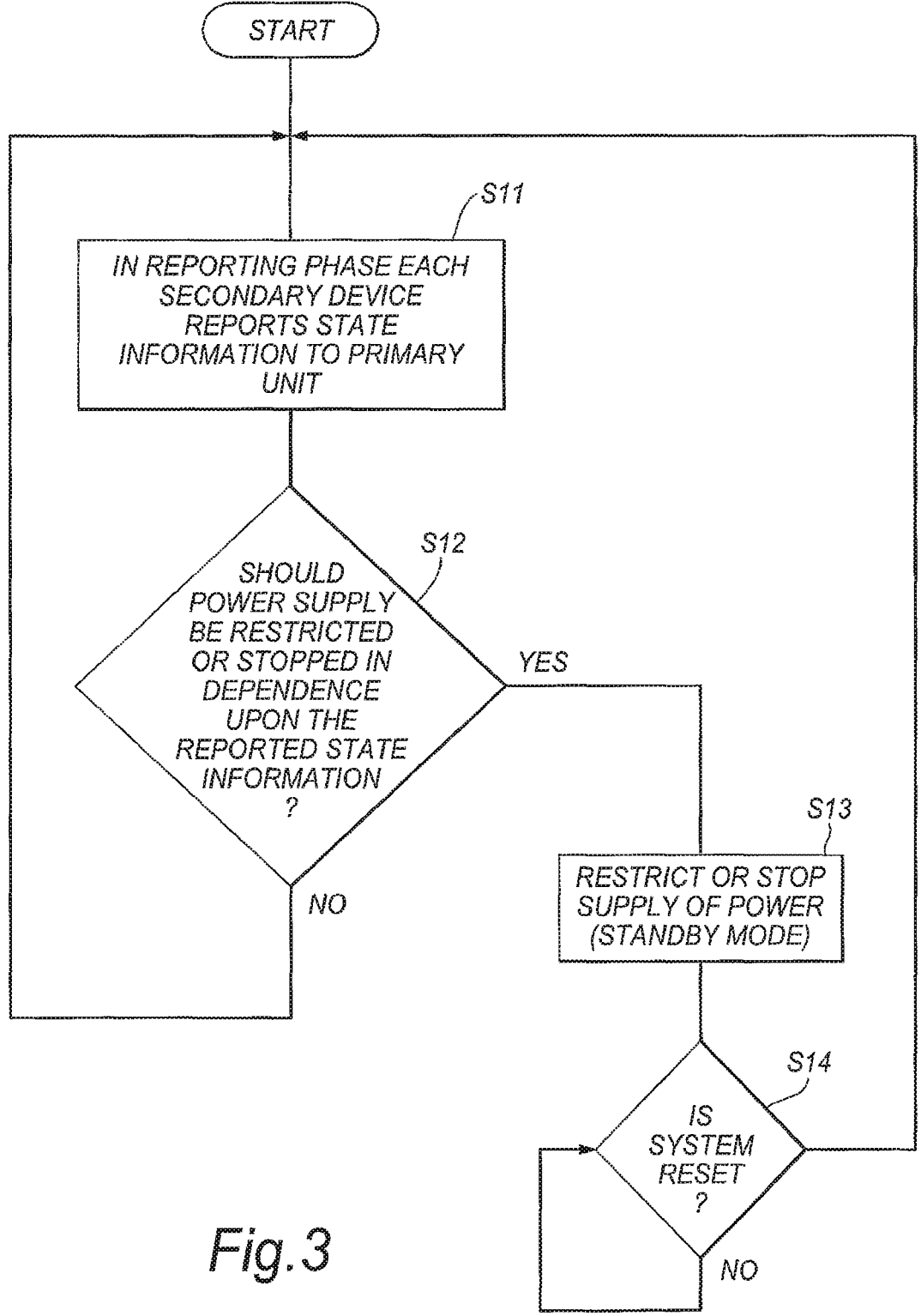
FIG. 3 is a flowchart for use in explaining a first method of detecting a standby condition in accordance with the present invention.

In FIG. 3, as shown in step S11, from time to time each secondary device (if any) that is present in the vicinity of the primary unit 10 has a reporting phase. All of the secondary devices which are present may enter a reporting phase simultaneously. Alternatively, each of the secondary devices in turn may enter the reporting phase individually. In either case, in the reporting phase each secondary device reports to the primary unit state information indicating whether the secondary device is in a no-power-requiring state or a power-requiring state. In the no-power-requiring state, an actual load of the secondary device currently requires no power from the primary unit. In the power-requiring state, on the other hand, the actual load does currently require power from the primary unit.

In step S12 the control unit 16 in the primary unit determines if the inductive power supply therefrom should be restricted or stopped in dependence upon the state information reported in step S11. In particular, unless at least one secondary device reports in the reporting phase to the primary unit that it is in the power-requiring state the control unit 16 determines that the inductive power supply should be restricted or stopped and processing proceeds to step S13 in which the primary unit is set into the standby mode. Of course, if no secondary device is present in the vicinity of the primary unit at all, so that in step S11 no or no valid state information is received by the primary unit, then the control unit 16 also sets the primary unit into the standby mode.

As described above in relation to step S5 of the method of FIG. 2, once the primary unit has been set into the standby mode it may be reset into an operating mode again either by manual intervention from a user or automatically.

If in step S12 the control unit 16 determines that the inductive power supply should not be restricted or stopped based on the reported state information, then processing returns to step S11, for example after a predetermined interval. In this way, each secondary device present periodically has a reporting phase in which it reports its state information to the primary unit.

The methods of FIGS. 2 and 3 may be carried out independently of one another. However, it is preferable for the control unit 16 of the primary unit to be able to detect both when to enter the shutdown mode and to enter the standby mode. This can be achieved by a combination of the methods of FIGS. 2 and 3 as will now be described with reference to FIG. 4.

Figure 4:
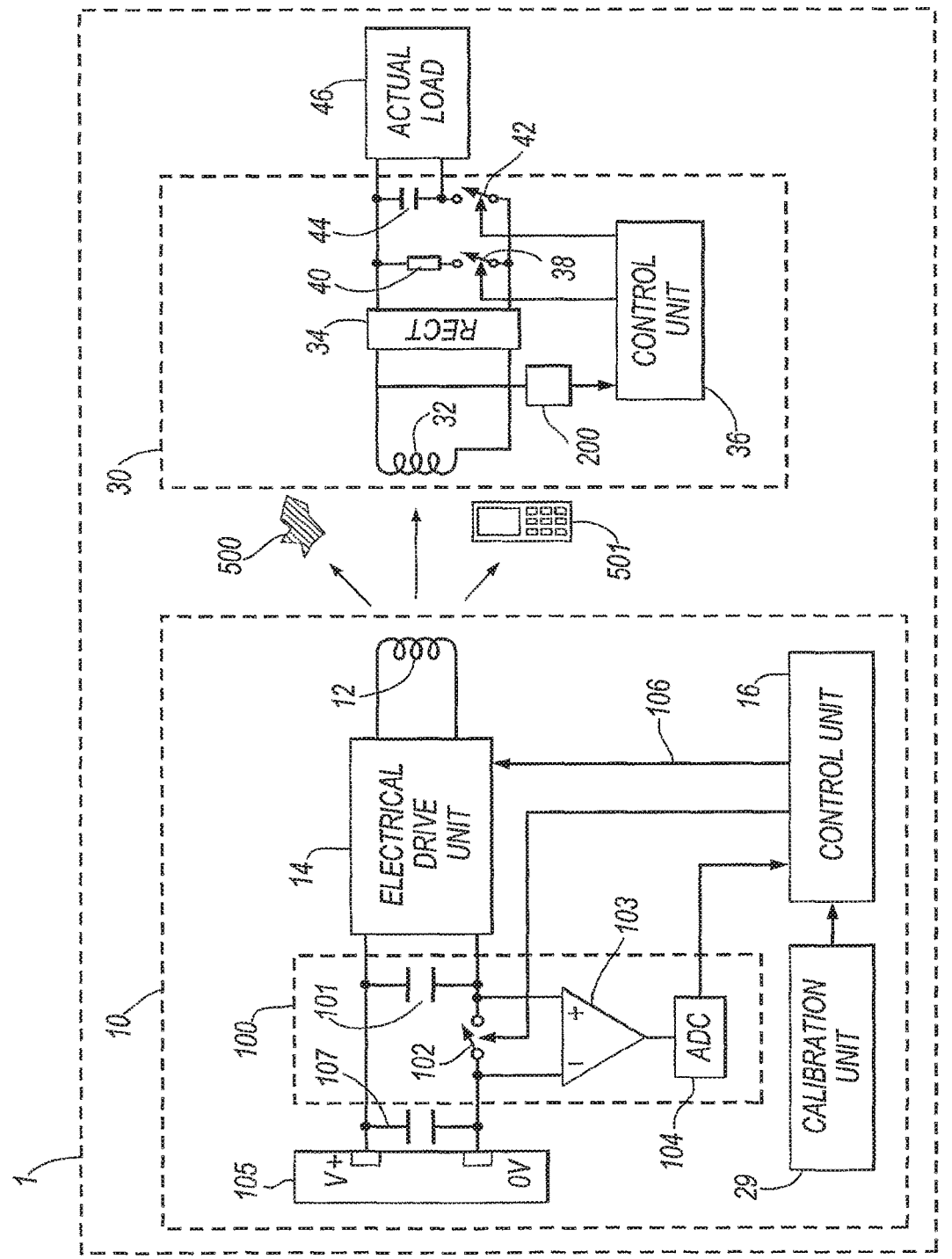
FIG. 4 is a block diagram showing parts of an inductive power transfer system according to a first embodiment of the present invention.

FIG. 4 shows parts of an inductive power transfer system according to a first embodiment of the present invention. The system 1 has a primary unit 10 and a secondary device 30. FIG. 4 also shows a parasitic load 500 on the primary unit, caused for example by a foreign object placed in the vicinity of the primary unit 10. The secondary device 30 in this case is assumed to be carried in or by a host object such as a portable electrical or electronic device. As explained hereinbefore the secondary device 30 and/or host object also inevitably impose a "friendly" parasitic load 501 on the primary unit 10.

As described earlier with reference to FIG. 1, the primary unit 10 comprises a primary coil 12, an electrical drive unit 14, a control unit 16 and a power measurement unit 100. The electrical drive unit 14 has an input connected to an output of the control unit 16 supplying the AC voltage signal 106. The output nodes of the electrical drive unit 14 are connected to the primary coil 12. The electrical drive unit is connected to the power supply 105, via the power measurement unit 100. The power supply 105 supplies direct current to the electrical drive unit 14. The electrical drive unit 14 presents a high input impedance for the AC voltage signal 106, so that essentially all the load current is drawn from power supply 105.

The control unit 16 is a microprocessor in this embodiment. The microprocessor has an inbuilt digital-to-analogue converter (not shown) to drive the output supplying the AC voltage signal 106. Alternatively, an ASIC could be used to implement the control unit 16, as well as some or all of the other circuit elements of the primary unit.

The control unit 16 in this embodiment is adapted to modulate the AC voltage signal 106 for transmitting a synchronisation signal to a secondary device. The modulation is a frequency modulation of the AC voltage signal. Other modulation techniques such as amplitude or phase modulation may also be used. The control unit 16 is adapted to send a synchronisation signal to any secondary devices 30 present. The secondary devices 30 alter their load conditions in response to the synchronisation signal. This information is used to detect the conditions for entering the shutdown and standby modes.

It is desirable for the power measurement unit 100 to be operative without the need to disconnect the electrical supply to the primary coil 12, as this means that supply to the secondary device 30 is not interrupted and it reduces stray electromagnetic interference into the surrounding environment. This is challenging because there is a lot of noise and the measurement is required in a short time.

The power measurement unit 100 comprises a switch 102 between the 0V supply in the power supply 105 and the ground terminal of the electrical drive unit 14. The switch 102 is controlled by the control unit 16. The power measurement unit also comprises a capacitor 101 connected between the positive and ground terminals of the electrical drive unit 14. The capacitor functions as an energy storage unit. There is a differential amplifier 103 with inputs either side of the switch 102 which has an output coupled to an analogue-to-digital converter 104. The analogue-to-digital converter output is coupled to the control unit 16.

When the switch 102 is closed, the power measurement unit 100 is not operative and the power is directly coupled from the power supply 105 to the electrical drive unit 14. A power measurement is performed when the switch 102 is opened. The capacitor 101 is now disconnected from the 0V rail on the power supply 105, but still retains its charge. The electrical drive unit 14 meanwhile continues to draw current and therefore discharges the capacitor 101. In so doing the voltage across the capacitor 101 decays slightly and consequently the voltage at the point between the capacitor 101 and switch 102 rises slightly above 0V. The reservoir capacitor 107 ensures that the positive supply voltage remains constant. The differential amplifier 103 measures the voltage across the switch 102 and the resulting measurement is converted into a digital signal by the analogue-to-digital converter 104 and passed to the control unit 16. The small temporary voltage drop across the electrical drive unit 14 does not have any noticeable effect on the power transfer to the secondary devices 30.

Figure 5:
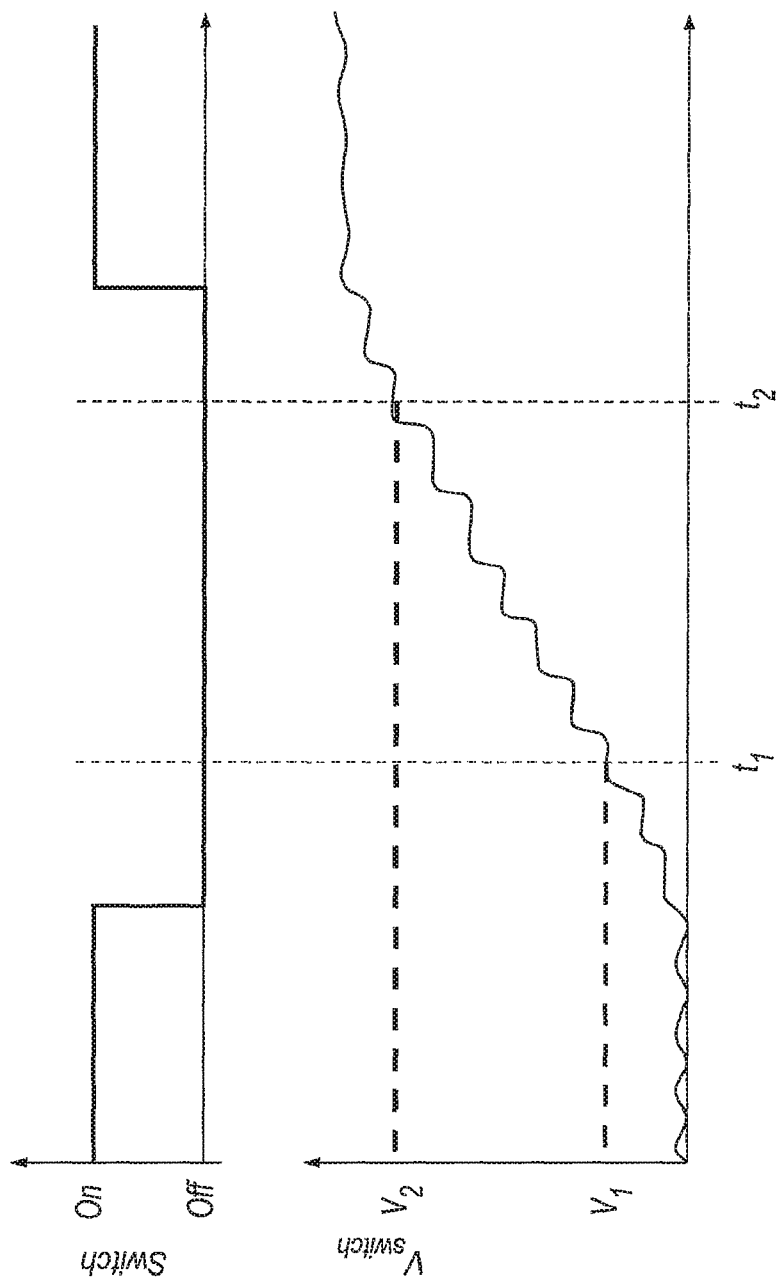
FIG. 5 shows waveform diagrams for use in explaining operation of the FIG. 4 system.

Whilst the switch 102 is open, two separate measurements are taken at time $t_1$ and $t_2$, giving measurements $V_1$ and $V_2$ respectively, shown in FIG. 5. There is a delay $t_1$ after the switch is opened to allow transient effects to stabilise. The power, P is then given by $$P = CV\frac{dV}{dt} = C\left(V^+ - \frac{(V_1 + V_2)}{2}\right)\frac{(V_2 - V_1)}{(t_2 - t_1)} \approx CV^+\frac{(V_2 - V_1)}{(t_2 - t_1)}$$

where $V^+$ is the supply voltage, assuming $V_1, V_2 \ll V^+$. It is advantageous to sample the voltage level at the same point in the cycle, so that the periodic perturbation in voltage is removed (also shown in FIG. 5). The switch 102 is then closed again to reconnect the power supply 105 to the electrical drive unit 14.

Incidentally, instead of the capacitor 101 an inductor could be used as an energy storage unit. In this case, the change measured by the circuitry during the disconnection of the power supply might be a change in current, for example measured as a voltage drop across a series resistor.

The primary unit 10 further comprises a calibration unit 29 in this embodiment. The calibration unit 29 stores compensation information about the losses in the primary unit (e.g. electrical or magnetic losses). By design, at manufacture, and/or periodically thereafter, the losses in the primary unit may be calibrated and stored within the calibration unit 29. The calibration unit 29 supplies the stored information to the control unit 16 to enable the control unit 16 to subtract the losses from the total measurement, thus calculating a number for the loss due to parasitic loads alone. This calibration unit 29 may vary the compensation information to cope with variable losses in the primary unit, for example losses which vary with temperature.

The secondary device 30 comprises a secondary coil 32, a rectifier 34, a secondary control unit 36, a dummy load switch 38, a dummy load 40, a load switch 42, a storage unit 44 and an actual load 46. The dummy load switch 38 and the load switch 42 may each be an FET, for example. The dummy load 40 is, for example, a resistor. The storage unit 44 is a capacitor in this embodiment but an inductor could be used instead. The actual load 46 is external to the secondary device 30 in this embodiment and is part of the host object. It could be a battery charge controller for a Lithium-ion cell.

There is also a detection unit 200 for detecting a modulation imposed on the received AC signal. To detect a frequency modulated signal, the detection unit 200 may be a zero crossing detector which passes a signal to the control unit every time the AC signal crosses zero volts. The control unit 36 may then comprise an internal clock and counter circuit (not shown). The clock and counter circuit may be used to measure the time interval between successive zero crossings and hence derive the frequency of the AC signal 106 imposed by the primary unit control unit 16. Hence, the secondary unit may detect a change in frequency and respond by altering its load conditions by adjusting switches 42 and 38.

Other forms of load detection circuit 200 may comprise a threshold detector for digital amplitude modulation or an analogue-to-digital converter for multiple level amplitude modulation or a phase detector for phase modulation or any combination thereof.

Operation of the system will now be described.

In an "operating mode" of the system, the host object incorporating the secondary device 30 is placed on or in proximity to the primary unit 10. Switch 102 is closed. The control unit 16 applies an AC voltage signal 106 to the electrical drive unit 14. The electrical drive unit 14 takes DC power from the power supply 105 and amplifies the AC voltage signal 106 and applies it to the primary coil 12.

In the operating mode, the primary coil 12 generates an electromagnetic field in the vicinity of the primary unit 10. The secondary coil 32 couples with this field and an alternating current is induced in the coil by the field. The dummy load switch 38 is open and the load switch 42 is closed. The alternating current induced in the secondary coil 32 is rectified by the rectifier 34 and the rectified current is supplied via the load switch 42 to the storage unit 44 and the actual load 46. In this way, power is transferred inductively from the primary unit 10 to the secondary device 30 and from there to the load 46. The storage unit 44 stores energy in the operating mode.

Whilst in the operating mode, from time to time the control unit 16 in the primary unit 10 initiates a measurement. The measurement starts with the primary unit 10 sending a synchronisation signal to the secondary unit 30 by applying a momentary frequency change to the AC drive voltage signal 106. The secondary devices 30 receive the AC voltage signal and in each receiving secondary device the detection unit 200 in conjunction with the control unit 36 determine when the synchronisation signal has occurred. In response to a synchronisation signal, the secondary units present alter their load conditions for a set time period and the primary unit 10 measures the total load (power drawn) within this time period.

The secondary device 30 uses the storage unit 44 to store energy from the primary unit 10 during normal operation. During the measurement, the actual load 46 is disconnected by opening switch 42. The energy stored in the storage unit 44 of the secondary device gradually decays as energy is delivered to the load. Provided that the storage unit has sufficient capacity, and is sufficiently well-charged before a measurement commences, the storage unit can deliver continuous power to the secondary device load throughout the measurement, so the actual load 46 is not interrupted.

In this embodiment the primary unit 10 initiates a series of three power measurements for the purposes of determining: 1) whether the there is a parasitic metal present requiring it to enter the shutdown mode to prevent overheating and 2) if there are no devices requiring any power, such that the unit can enter the standby mode. The behaviour of the primary unit 10 and the secondary device 30 is slightly different in each of the three measurements of the series.

During the first measurement, the secondary control unit 36 has the dummy load switch 38 open so that the dummy load 40 is not connected to the secondary coil 32. As a result, the first measurement is a measure of the power delivered to any parasitic loads 500 from foreign objects in the vicinity of the primary unit and any parasitic load 501 imposed by losses in the secondary device and/or its host object and any losses in the primary unit itself. Thus, operation during the first measurement corresponds to the steps S1 to S3 of FIG. 2 above.

During the second measurement, the secondary control unit 36 selectively closes the dummy load switch 38. The secondary control unit 36 decides whether to have the dummy load switch 38 open or closed during the second measurement based on the power requirement of the actual load 46. If the load 46 does not require any power at the present time, for example because it has a rechargeable battery which is presently fully charged, then the dummy load switch 38 is kept open during the second measurement. If, on the other hand, the load 46 does require power at the present time, then the dummy load switch 38 is closed so that the dummy load 40 is connected to the primary coil 32.

The control unit 16 produces another measure of the power load during the second measurement. If the second power measurement is substantially different from the first power measurement, the control unit 16 detects that a secondary device requiring power is present in the vicinity of the primary unit. Thus, operation during the second measurement corresponds to steps S11 and S12 of FIG. 3 above.

During the third measurement, the secondary control unit 36 always closes the dummy load switch 38 so that the dummy load 40 is connected to the secondary coil 32.

Another power measure is taken by the control unit 16 in the primary unit. In this case, the measurement is the sum of the parasitic loads 500, the parasitic load 501 of the secondary device and/or host object, primary unit losses, and the dummy load 40. Based on the difference between the first and third power measurements, the control unit calculates the value of the total of the dummy loads 40 in all of the secondary devices present in the vicinity of the primary unit.

Figure 6:
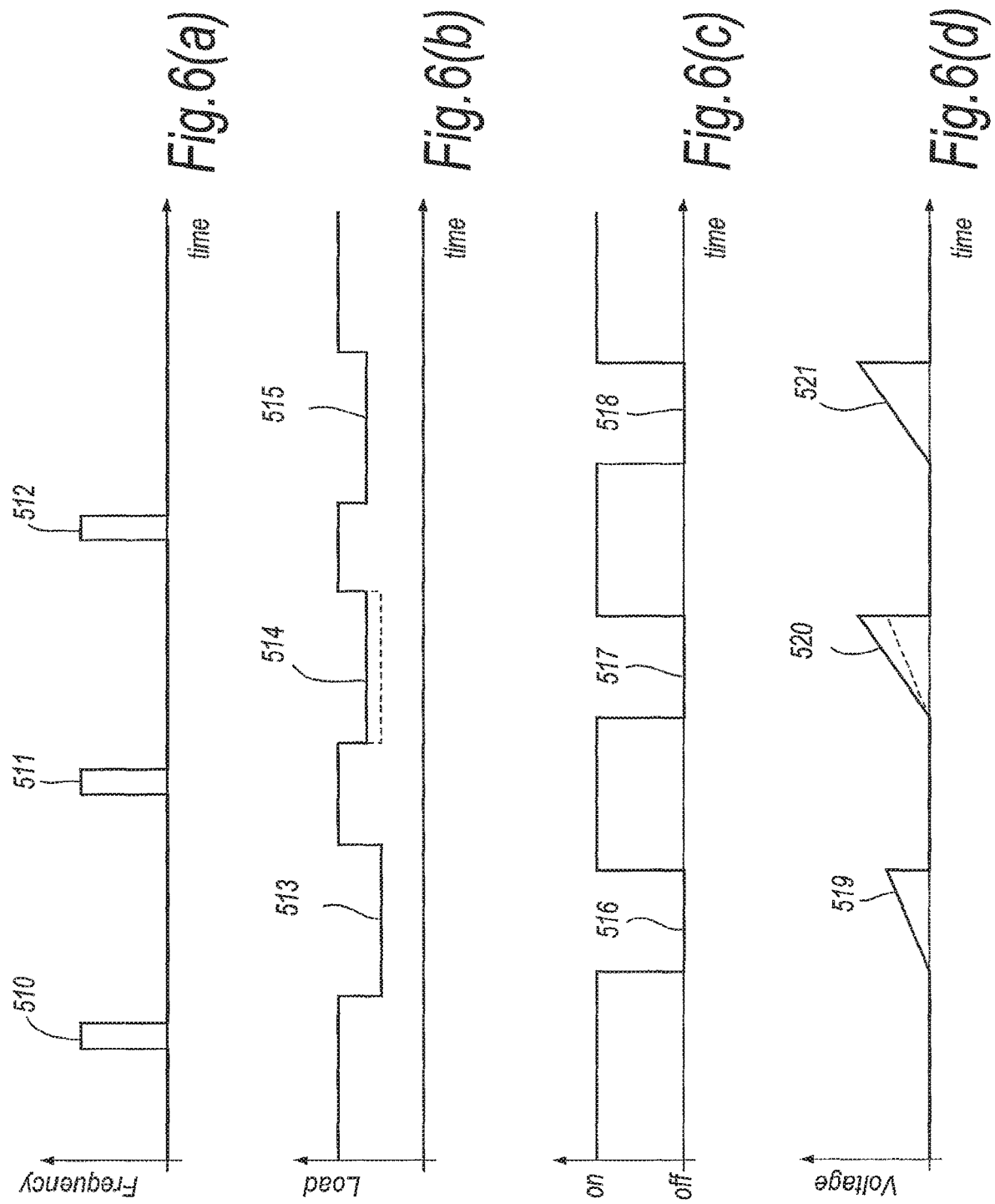
FIGS. 6(a) through 6(d) show waveform diagrams showing the timing of the various signals within the FIG. 4 system.

The timing of the various signals and measurements is illustrated diagrammatically in FIGS. 6(*a*) through 6(*d*) (not to scale). FIG. 6(*a*) represents the frequency of the drive applied to the primary coil 12, FIG. 6(*b*) represents the load presented by the secondary device 30, FIG. 6(*c*) represents the state of the switch 102 in the primary unit 10 and FIG. 6(*d*) represents the voltage across the switch 102.

At the start of each measurement, the primary unit 10 first momentarily changes the frequency of the drive to the primary coil 510, 511, 512, for the first, second and third measurements respectively. Then each secondary device 30 isolates its actual load 513, 514, 515 and depending on the circumstances introduces a dummy load 514, 515. Within this time frame, the switch 102 in the primary unit opens 516, 517, 518. Within the window of the switch opening, the voltage across the switch 106 ramps up 519, 520, 521. This voltage is sampled at several points within this window to measure the power. On the first measurement, there is no dummy load 513, on the second measurement each device only connects the dummy load if its actual load requires power 514, on the third measurement the dummy load is always connected 515.

The secondary device 30 knows which measurement is which by the order in which they occur. If there has been a long gap of say a few ms since the last synchronisation signal then the secondary device knows that it must be the first measurement. The secondary device can count the number of periods in the received alternating current to determine this. The second and third measurement synchronisation signals naturally follow in that order within a set number of cycles. In order to get more accurate measurements, it is possible to average each measurement over a number of sequences.

Each dummy load 40 in a secondary device 30 in the system of this embodiment is set to a particular value (at manufacture or during calibration or testing) so that the value represents the parasitic load 501 imposed by the secondary device concerned and/or by its host object.

Thus, the total dummy load for all secondary devices present, as calculated by the control unit 16, can be used by the control unit 16 as second compensation information to compensate for the parasitic loads 501 of the secondary devices present. For example, if the control unit 16 detects that a substantial parasitic load 500 is present in the vicinity of the primary unit when the measured power exceeds some threshold, the threshold may be increased by an amount dependent on the total parasitic load 501 of all the secondary devices present, so that the detection of parasitic loads 500 from foreign objects is not influenced by the number of secondary devices present.

Figure 7:
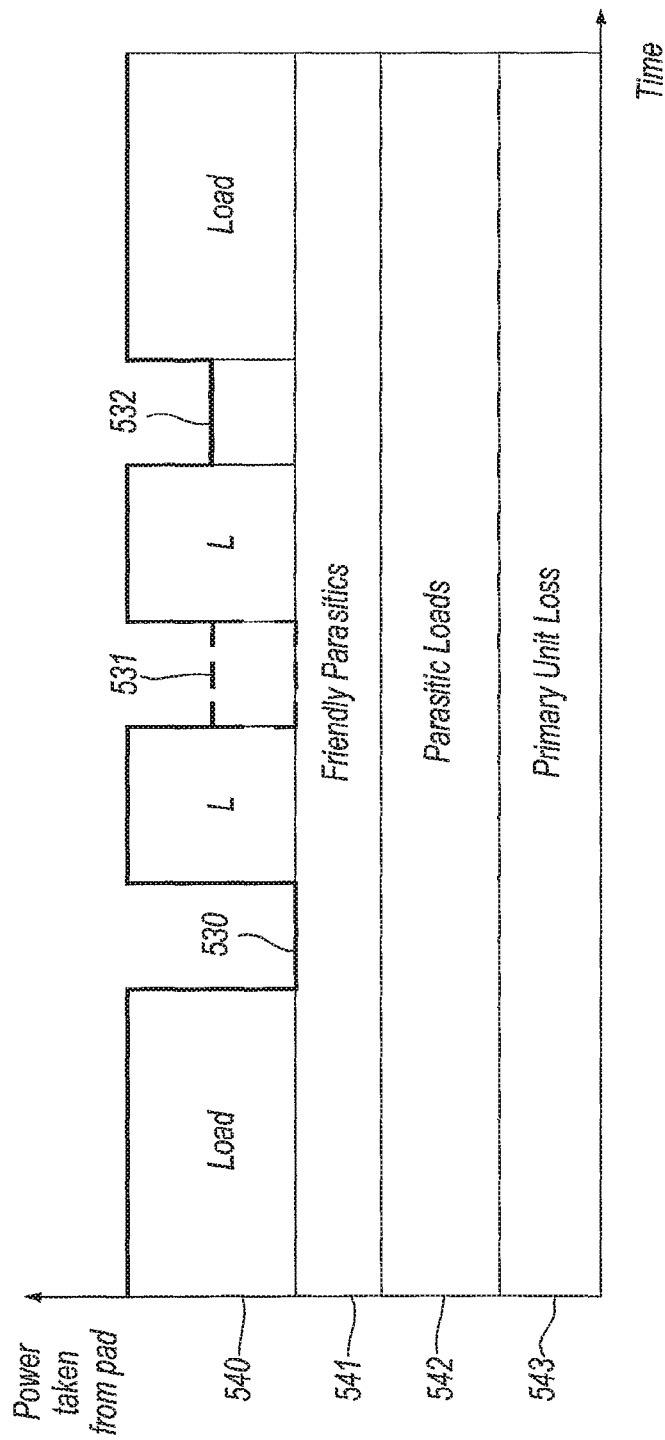
FIG. 7 is a diagram showing the load drawn during three different measurement operations.

FIG. 7 shows diagrammatically the load drawn for the three measurements. The load drawn is the sum of: the losses associated with the primary coil in the primary unit (pad) 543, the parasitic load associated with foreign metal objects 542, 'friendly parasitics' of metal associated with host object (portable device) to be powered 541 and the current load associated with all the secondary devices 540. The first measurement 530 has all of these components except the load 540. If no devices require power then the second measurement 531 will be the same as the first measurement 530, so the primary unit can be placed into the standby mode (step S4 in FIG. 3). However, if at least one device requires power then the second measurement 531 will be greater than the first measurement 530, and power is required. On the third measurement, each secondary device 30 connects its dummy load. The dummy load of each device 40 is made equal to that device's 'friendly parastics'. By subtracting the first measurement from the third measurement, the result is the 'friendly parasitics' 541. The primary unit loss 543 is known (and stored in the calibration unit 29). To produce a measure of the total parasitic load 542 present, the calculated 'friendly parasitics' 541 and the known primary unit loss 543 may be subtracted from the first measurement 530. If this figure is above a certain threshold then the unit can be placed into the shutdown mode (step S4 in FIG. 2).

A system embodying the present invention is capable of measuring loads imposed on the primary unit sensitively, for example to within 50 mW or so. With this degree of sensitivity, it is possible to ensure that very little power is coupled into parasitic loads 500 such as foreign objects.

Figure 8:
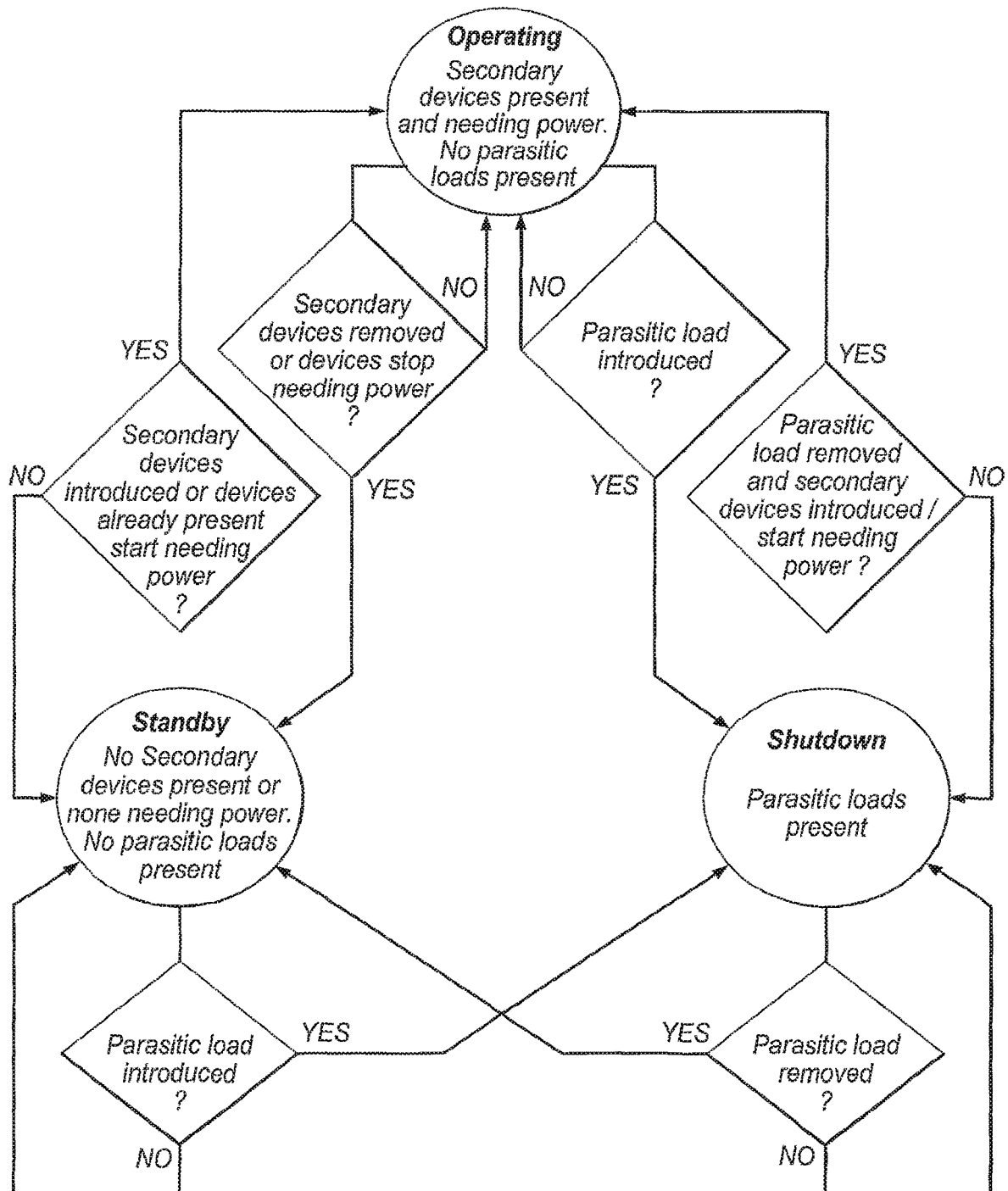
FIG. 8 is a diagram illustrating different modes of operation in the FIG. 4 system.

FIG. 8 is a diagram illustrating the different modes of operation in the FIG. 4 system and the conditions for switching between these different modes. The three modes of operation are an operating mode, a shutdown mode and a standby mode.

In the operating mode, the primary unit is in the normal state (driven condition) most of the time, but periodically does a sequence of three measurements as described above. If the result of the measurement sequence is that no secondary device requires power, the primary unit goes into a standby mode. If the result of the measurement sequence is that a significant parasitic load 500 is present, the primary unit goes into a shutdown mode.

In the standby mode, the electrical drive unit 14 is stopped for most of the time, thus consuming little power. Periodically the primary unit enters the normal mode, then does a series of measurements in respective probing periods, to check whether it should enter either the operating mode or the shutdown mode. Otherwise it remains in the standby mode.

The shutdown mode is functionally identical to standby mode. However, the two modes may be distinguished by some user-interface feature such as an LED to prompt the user to remove any substantial parasitic load 500.

In addition to this first embodiment of the invention, there are many other possible embodiments and combinations of features that may be utilised to advantage.

There are other inductive power transfer systems, which rather than have a single primary coil 12 have a plurality of coils, for instance as described in GB-A-2398176. In such a system there may be two sets of coils which are arranged orthogonally to each other. They may each be driven with the same AC voltage signal, but driven in quadrature (i.e. separated in phase by 90°), such that the induced magnetic field rotates with time. This allows the secondary device 30 to be placed at any orientation and still be able to receive electrical power. The present invention may be used in such a configuration directly. The electrical drive unit 14 not only supplies the AC current drive to the first coil, but also to the second coil. The transmitted synchronisation signals will be present on both coils. Furthermore, since the current measurement is performed by determining the current drawn from the power supply, the power measurement will be the total sum of all the load drawn regardless of what proportion is drawn by each coil. In such a 2 channel rotating system, the orientation of the secondary device 30 is arbitrary. Therefore the secondary device 30 will see a +/−180° phase difference relative to the primary unit. Therefore the secondary devices 30, must each lift their load for at least ½ cycle each side of the primary unit's measurement period.

In addition to the three measurements described, a fourth measurement may be made. This measure is initiated by the control unit 16 in the primary unit 10, and results in the power measurement unit 100 taking a power measurement, but without any synchronisation signal being sent to the primary coil 12. The secondary units 30 do not alter their load conditions and this is therefore a measurement of the power whilst in the operating state. This measurement can be performed at any time other than during a measurement sequence of the first three measurements. This fourth measurement is used to determine if the total load drawn is greater than the power specification of the device and hence put the primary unit into an 'overload state'. The 'overload' state is functionally identical to the 'shutdown state', but may be distinguished by some use-interface feature such as an LED.

Another possibility is for the electrical drive unit 14 to be adapted to modify the magnitude of its output current into the primary coil for the purpose of varying the field magnitude of the generated magnetic field. This would allow the field magnitude to be reduced for small loads, thereby conserving electrical power. An implementation of this feature is to use the first and second measurements in a different way, not only to detect if devices require power, but also to set the required field magnitude. Instead of switching in the dummy load 40 during the second measurement if it needs power, a secondary device could switch in its dummy load if it is not getting sufficient power. The presence of a difference between the first and second measurements would then be taken by the primary unit as a "not enough power" signal. The primary unit 10 could periodically bring the field up to maximum magnitude and then gradually reduce it until the difference between the first and second measurements was greater than a certain threshold ("not enough power" signal). This way the primary unit would always be operating at the lowest possible field magnitude.

In another embodiment, the secondary devices are adapted for changing the magnitude of their dummy loads dynamically. This could be achieved for instance by incorporating a load which may be altered in value by a control means. A simple example might be a resistor ladder with an array of switches, which may be arranged with values in binary increments. The load may be adapted to have a continuously variable magnitude by use of a transistor circuit or by incorporation of some other nonlinear element. Another way of dynamically changing the load is to modulate the switch 40 which connects the load, such that when the power measurement is averaged over the measurement time interval, the effective load is altered. The pulse width or duty cycle could be altered to change the effective load magnitude.

The ability to change the dummy load dynamically is useful for devices whose 'friendly parasitic' load may change. For instance a self-charging battery may have a different 'friendly parasitic' load when charged alone, compared to when it is charged whilst connected to a mobile phone. The control unit 36 could detect whether the phone was attached and modify the dummy load accordingly. Alternatively, the phone could communicate its 'friendly parasitics' to the battery. Other removable attachments which contribute additional 'friendly parasitic' load could also be detected and the dummy load modified accordingly. These include for example, but are not limited to, removable camera attachments, cases and speakers.

In addition to giving information about the load requirements and parasitic information of the secondary device 30, this method could be used such that the primary unit 10 could deduce other information about the secondary device 30. For example the primary unit 10 could receive information about the serial number, model number, power requirements or other information stored in the secondary device. The load could be altered dynamically either synchronously or asynchronously to achieve this. Amplitude modulation or pulse width modulation may be used. A number of 'bits' or 'symbols' may be used (where a 'symbol' represents a plurality of amplitude levels or pulse width durations and therefore more than one 'bit').

In another embodiment, the primary unit 10 could communicate information to the secondary device 30, other than synchronisation signals, by means of modulating the AC voltage signal 106 applied to the electrical drive unit. This information may include but is not limited to information about the primary unit 10, such as cost of a charge, power capability, codes; information about the location of the primary unit, such as nearby facilities; and other information such as advertising material. The secondary device 30 could receive such information by means of the detection element 200 and the control unit 36.

It will be apparent to those skilled in the art that it is not necessary to implement all these features simultaneously in order to gain advantage. For instance by only using the first and second measurements, the standby detect feature may be implemented. Similarly, by only using the first and third measurements, the parasitic detect feature may be implemented. By only using the fourth measurement, the overload detect feature may be implemented. Information about the secondary device 30 may be deduced by the primary unit, without implementing other features. Similarly, information may be sent from the primary unit to the secondary device without implementing other features. Further measurements may be used to implement additional features. It should be appreciated that the labelling of each measurement is purely for identification purposes and the measurements may be performed in any order.

In addition to the described method of sending a synchronisation signal before each measurement and identifying each measurement by the order in which they occur, there are other methods of identifying each measurement. These include but are not limited to: sending a different synchronisation signal before each measurement, whereby synchronisation signals may differ in frequency offset, amplitude or phase; or sending only a first synchronisation signal and deducing the timing of the other measurements may be means of either a counter to count cycles of the received signal or an internal clock within each secondary device. It is even possible to perform the measurements back to back, with no substantial gap between them. Alternatively measurements are initiated by the secondary device rather than the primary unit. The secondary device could initiate a 'preamble' dynamic load modulation, which the primary unit would detect and then synchronise on, so that its power measurements coincided with the timing of the secondary device adapting its load conditions. For primary units capable of simultaneously supplying power to more than one secondary device, the 'preamble' could involve the use of some unique identifier, so that each secondary device may be interrogated independently. 'Preambles' could also be used in communication from the primary unit to the secondary device to address each device independently.

As described above, the dummy load may be used to represent the 'friendly parasitic' load of the host device. Of course, the ratio between the dummy load value and the friendly parasitic load to be communicated is not limited to any particular value. For instance the dummy load could be twice or three times the 'friendly parasitic' value or a noninteger multiple of the value. The primary unit can deduce the total 'friendly parasitic load' so long as it knows what the ratio is. Furthermore, if a device does not have any significant 'friendly parasitic' load, it may be desirable to 'assign' it a particular value, so that it may be used for indicating whether the device requires charge. It may be desirable to use more than one dummy load. A first dummy load may be used for the second measurement and a second dummy load may be used for the third measurement. The first dummy load would be used for standby detection and the second dummy load would be representative of the 'friendly parasitics'. This is particularly advantageous if the secondary devices have widely varying parasitic loads. The first dummy load could also be used for determining the power requirements of the secondary devices requiring charging, rather just making a standby decision. The dummy load value would be adapted to be representative of the power requirements of that particular device. The first and second dummy loads may be implemented by a single dynamically variable dummy load described above, or fixed loads may be used, or a combination of the two.

In addition to the power measurement method and apparatus described, it will be appreciated that there are many methods which can be used to detect the load on the primary coil or coils. The simplest power measurement may comprise inserting a series resistor on one supply rail. The voltage could be measured across that resistor and the power deduced from the observed voltage and the known resistor value. With such a method it may be desirable to incorporate a switch across the resistor, so that during periods outside of the measurement time, the resistor may be short circuited, such that there is no unnecessary power dissipation in the resistor.

Another method of power measurement is to measure the power within the electrical drive unit. For instance, it is desirable for the electrical drive to the coil or coils to be regulated by means of a feedback circuit. The feedback signal may be used to derive a power measurement.

It is also possible to combine the functions of sending a synchronisation signal and power measurement within a single element as described for instance, in the applicant's copending application GB 0410503.7 filed on 11 May 2004, from which the present application claims priority. In that system, the power measurement involves disconnecting the power to the primary coils and detecting the decay in the undriven resonant circuit. The act of disconnecting the power to the primary coil 12 also has the effect of modulating the signal in the primary coil and as a result the signal received in the secondary device 30.

Figure 9:
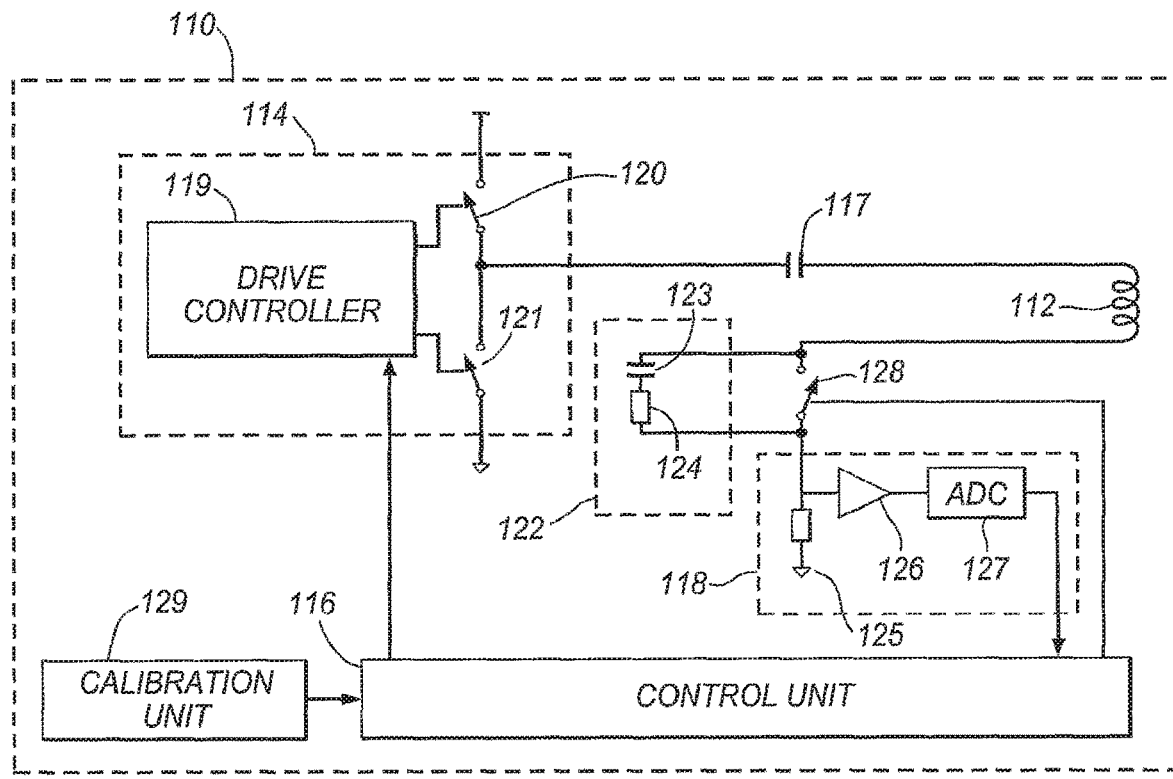
FIG. 9 is a block diagram showing parts of a primary unit in a power transfer system according to a second embodiment of the present invention.

FIG. 9 shows a second embodiment of a power transfer system according to the present invention. This embodiment differs from the first embodiment of FIG. 4 mainly in the way in which the power measurements are carried out. The primary unit 110 comprises a primary coil 112, an electrical drive unit 114, a control unit 116 and a decay measurement unit 118. The electrical drive unit 114 in this embodiment has a conventional half bridge configuration in which a first switch 120 is connected between a first power supply line of the primary unit and an output node of the electrical drive unit, and a second switch 121 is connected between the output node and a second power supply line of the primary unit. The first and second switches 120 and 121 may, for example, be field-effect transistors (FETs).

The electrical drive unit 114 also comprises a drive controller 119 which applies control signals to the switches 121 and 122 to turn them on and off. The drive controller 119 has a control input connected to an output of the control unit 116. The output node of the electrical drive unit 114 is connected via a capacitor 117 to one side of the primary coil 112.

The control unit 116 is a microprocessor in this embodiment. Alternatively, an ASIC could be used to implement the control unit 116, as well as some or all of the other circuit elements of the primary unit.

The decay measurement unit 118 comprises a resistor 125 which has a first node connected to one side of a switch 128 and a second node connected to the second power supply line. The resistor 125 is a low-value resistor. The decay measurement unit 118 further comprises an operational amplifier 126 having an input connected to the first node of the resistor 125. The decay measurement unit 118 also comprises an analog-to-digital converter (ADC) 127 connected to an output of the operational amplifier 126. An output of the ADC 127 is connected to a measurement input of the control unit 116.

The other side of the switch 128 is connected to the other side of the primary coil 112. A snubber unit 122 is connected in parallel with the switch 128. The snubber unit 122 comprises a capacitor 123 and a resistor 124 connected in series with one another. The calibration unit 129 is the same as the calibration unit 29 in FIG. 4.

Each secondary device in this embodiment can be substantially the same as the secondary device 30 in FIG. 4, and accordingly a description thereof is omitted here and no secondary device is illustrated in FIG. 9.

Operation of the FIG. 9 system will now be described with reference to FIG. 10.

Initially, the system has a normal state in which the control unit 116 causes the electrical drive unit 114 to apply drive signals to the primary coil 112 to cause it to oscillate. It will be appreciated that in the operating mode, the system is in this state for almost all the time. The switch 128 is closed, and the circuit including the capacitor 117 and primary coil 112 forms a resonant tank.

The next state is a "snub" state. The application of drive signals to the primary coil 112 by the electrical drive unit 114 is suspended under the control of the control unit 116.

The drive controller 119 closes the switch 121. The control unit 116 also opens the switch 128 at a time when most of the energy in the resonant tank resides in the capacitor 117. The opening of the switch 128 brings the snubber unit 122 in series with the resonant tank. The snubber unit 122 quickly dissipates any energy which remains in the primary coil 112, stopping it from resonating within one cycle or so. Most of the energy stored in the resonant tank is left in the capacitor 117. The sudden cessation of cycles is detected by the detection unit 200 and the secondary control unit 36 in the secondary device 30. The secondary control unit 36 opens the load switch 42. Incidentally, it will be appreciated that he detection unit 200 in FIG. 4 needs to be modified to detect the sudden cessation of cycles in the snub state in the present embodiment. A threshold detector (as mentioned above) may be used as the detection unit in the present embodiment.

In this embodiment, therefore, the snub state is used as the synchronisation signal to the secondary device, though the other forms (e.g. frequency or phase modulation) could also be used. It is not always necessary to have a synchronisation signal before every measurement as described above.

The system then enters the decay state from the snub state. The control unit 116 closes the switch 128, removing the snubber unit 122 from the resonant tank, and thus allowing the energy in capacitor 117 to flow again within the resonant tank. In the decay state, the resonant tank operates in an undriven resonating condition. Energy stored in the resonant tank decays over the course of time in the decay state. In this embodiment, the decay measurement unit 118 measures the energy decay in the resonant tank by measuring the current flowing through the primary coil 112. The same current flows through the resistor 125 and generates a voltage at the first node of that resistor. This voltage is buffered by the operational amplifier 126 and converted into a digital signal by the ADC 127. The resulting digital signal is applied to the measurement input of the control unit 116.

Figure 10:
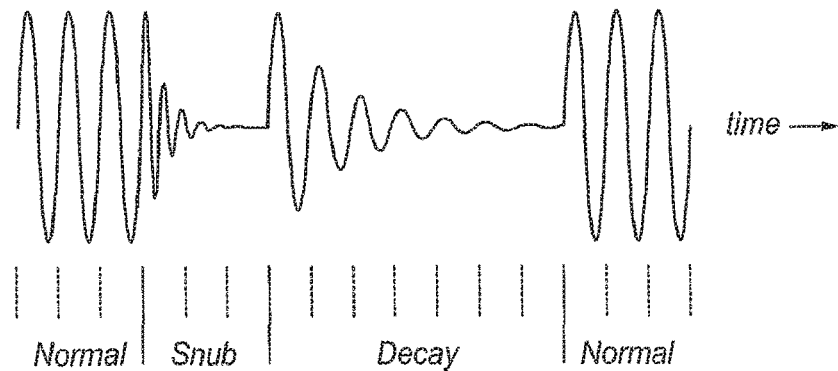
FIG. 10 shows waveform diagrams for use in explaining operation of the FIG. 9 system.

FIG. 10 shows how the current flowing through the primary coil 12 varies in the normal, snub and decay states which occur during a power measurement. In this embodiment, the digital signals representing the current flowing in the primary coil within a measurement period are received and processed within the control unit 16 to calculate a measure of the rate of energy decay in the resonant tank.

An equation describing the energy stored in the resonant tank, at resonance, is:

$$E = \tfrac{1}{2} L \hat{I}^2 = \tfrac{1}{2} C \hat{V}^2$$

where E is the energy, L the inductance, $\hat{I}$ is the peak current, C is the capacitance and $\hat{V}$ is the peak voltage.

Therefore the energy stored in the resonant tank of the primary unit at any given moment can be calculated if the inductance and peak current are known, or if the capacitance and peak voltage are known, or combinations thereof. Typically the capacitance is known by design, the peak current and voltage can be measured by suitable circuitry, and the inductance can be deduced by observing the natural resonant frequency during the measurement and applying the formula:

$$L = \frac{1}{4\pi^2 f^2 C}$$

The power measure, P, is given by the rate of decay of energy (and thus the loss) from the resonant tank and can be calculated by measuring $E_1$ at time $T_1$ and $E_2$ at another time $T_2$.

$$P = \frac{E_2 - E_1}{T_2 - T_1}$$

Since at resonance the voltage and current in the resonant tank will be 90 degrees out of phase with one another, a convenient method of reading the peak voltage of one is to trigger the measurement on the zero-crossing of the other.

A second method for detecting a shutdown condition in accordance with the present invention will be described with reference to FIG. 11. This method can be used in the FIG. 1 system.

When the FIG. 1 system is in use, from time to time each secondary device which is in the power-requiring state supplies information to the primary unit relating to its own power requirement. The power requirement information may take many different forms. For example, the information may comprise a binary part used to indicate either "no power required" or "power required". In this case, in the event that a binary part is "power required", supplemental information may be provided by the secondary device to indicate the amount of power required. Alternatively the power requirement information may simply be representative of the amount of power required, and "0" may be transmitted if the device requires no power at all. It is also possible that the power requirement of the secondary device may already be known to the primary unit. For example, it may be known that all secondary devices of a certain type will have a particular power requirement. In this case, the power requirement information may simply be a code (or some other identifying information) indicating the type of the secondary device.

All of the secondary devices may supply the power requirement information simultaneously to the primary unit. Alternatively, each secondary device supplies its power requirement information individually in turn to the primary unit.

The power requirement information supplied by each secondary device that has the power-requiring state is received by the primary unit.

In step S22, the control unit 16 in the primary unit causes the power measurement unit 100 to measure the power drawn by the secondary devices from the primary unit as described previously. In practice, the measured power will also reflect any losses in the system.

In step S23 the control unit 16 determines whether inductive power supply from the primary unit should be restricted or stopped in dependence upon the measured power in step S22 and the power requirement information received in step S21. For example, the control unit 16 calculates a sum of the respective power requirements of all of the secondary devices that are in the power-requiring state. This sum is compared with the measured power found in step S22. If the measured power exceeds the sum of the power requirements by more than a threshold value, then the control unit determines that a substantial parasitic load must be present in the vicinity of the primary unit. In that case, processing proceeds to step S24 in which the primary unit enters the shutdown mode and inductive power supply from the primary unit is restricted or stopped. As described previously in relation to the method of FIG. 2, the system may be reset manually or automatically in step S25.

If in step S23 the control unit 16 determines that the power supply need not be restricted or stopped, then processing returns to step S21, for example after a predetermined time interval.

To compensate for the losses in the primary unit and/or secondary devices, the shutdown threshold employed in step S23 may be adjusted. One way in which this can be done is for each secondary device (whether or not in the power-requiring state) to also supply to the primary unit information relating to its "friendly parasitic" load. Similarly, losses as in the primary unit may be accounted for using a calibration unit as described with reference to FIG. 4.

Figure 11:
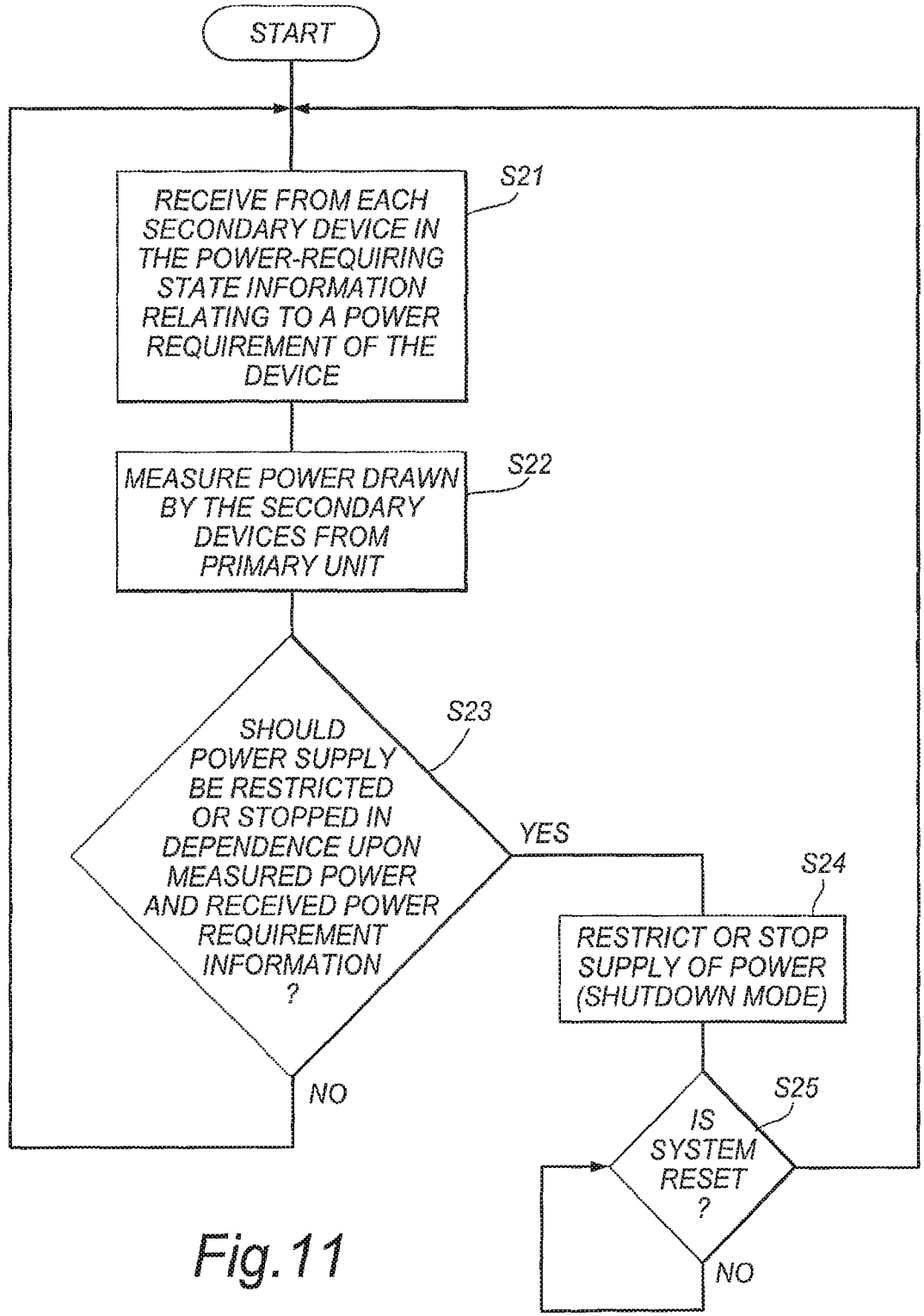
FIG. 11 is a flowchart for use in explaining a second method of detecting a shutdown condition in accordance with the present invention.
Figure 12:
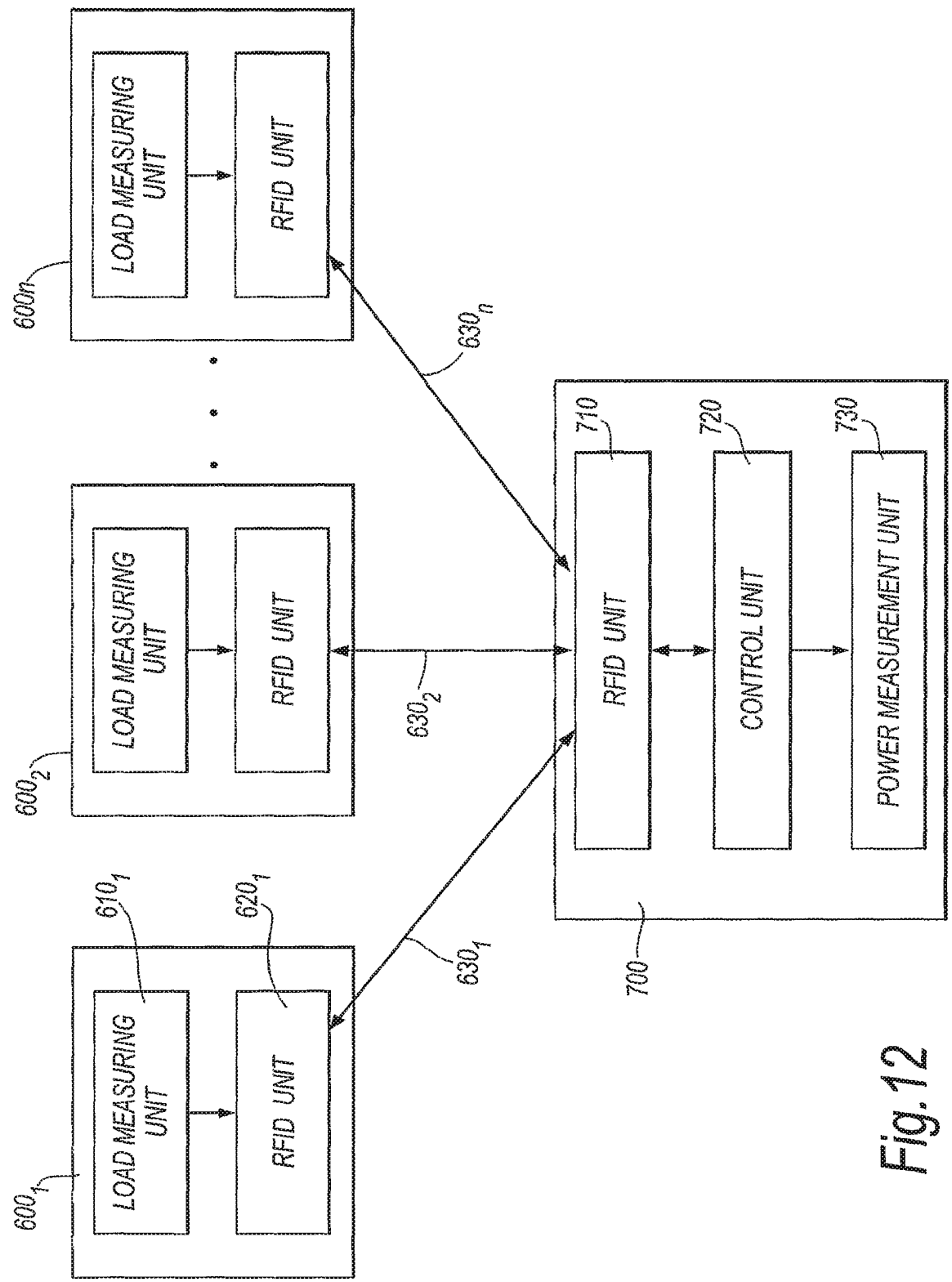
FIG. 12 is a block diagram showing parts of a power transfer system according to a third embodiment of the present invention.

FIG. 12 shows parts of a power transfer system according to a third embodiment of the present invention. This system implements the shutdown detection method of FIG. 11 using an RFID communication method.

The FIG. 12 system comprises a plurality of secondary devices $600_1$, $600_2$, ..., $600n$. The system of FIG. 12 also comprises a primary unit 700. The primary unit 700 comprises an RFID unit 710, a control unit 720 and a power measurement unit 730. The control unit 720 corresponds generally to the control unit 16 described previously with reference to FIG. 1, and the power measurement unit 730 corresponds generally to the power measurement unit 100 described in reference to FIG. 1.

The features of the secondary device 600 are generally the same as those of the secondary device 30 in FIG. 4 except that the elements 38, 40, 42, 44 and 200 may be omitted. Instead of these elements, each secondary device 600 comprises its own load measuring unit 610 and an RFID unit 620. The load measuring unit 610 measures the power being supplied to the actual load (46 in FIG. 4) of that secondary device. For example, the load measuring unit 610 may measure the current and/or voltage being supplied to the actual load 46 and may possibly integrate these measures over time for averaging purposes. For example, the averaging period may be ten seconds.

The RFID unit 620 in each secondary device is capable of communicating with the RFID unit 710 in the primary unit 700 using an RFID link 630. The load measure produced by the load measuring unit 610 in each secondary device is supplied to the RFID unit 620 in the device and then transmitted via the relevant RFID link 630 to the RFID unit 710 in the primary unit. For example, the RFID unit 710 may poll the RFID unit 610 in each of the secondary devices from time to time. In response, the RFID unit 620 that has been polled transmits its load measure. This load measure corresponds to the power requirement information of step S21 in FIG. 11.

The power measurement unit 730 in the primary unit also measures the power being drawn by the secondary devices from the primary unit, as in step S22 in FIG. 11. Then, the control unit 720 determines, in dependence upon the measured power and the sum of the received load measures from the secondary devices, whether or not the power supply to the secondary devices should be restricted or stopped. In particular, if the measured power from the power measurement unit 730 exceeds the sum of the load measures from the secondary devices by more than a shutdown threshold, then the control unit 720 concludes that a substantial parasitic load must be present and places the primary unit in the shutdown mode, as in step S24 in FIG. 11.

It is also possible for the load measure produced by each secondary device to represent a total load from the secondary device including the amount of power required by the actual load and any friendly parasitic load of the secondary device/host object. If the actual load requires no power the load measure may change to represent only the friendly parasitic load.

Some anti-collision or collision avoidance technique is necessary in the FIG. 12 embodiment. In one known collision avoidance technique, every RFID unit 620 has an unique code (or one which will be practically unique based on statistics). The RFID unit 710 in the primary unit would send out a signal requesting that all RFID units 620 within a certain range reply. The RFID units 620 send out their reply in code (e.g. Manchester code), so that the RFID unit 710 can tell if more than one device has replied. The primary unit gradually narrows down the range until it can uniquely identify the code of each device present. Typically, it may halve the range of codes in each iteration to home in quickly.

It will be appreciated that instead of RFID, any suitable communication link can be used to permit each secondary device to communicate its power requirement information to the primary unit. For example, infrared or ultrasound communication could be used. Alternatively, each secondary device could vary the load it imposes on the primary unit to communicate the power requirement information. For example, each secondary device could impose a dummy load representing the amount of power required by its actual load. In this technique, all the secondary devices in the power-requiring state can impose their respective dummy loads simultaneously, so that the primary unit can directly derive the sum of the power requirements of all the secondary devices in one measurement. Alternatively, the dummy load may represent a total load from the secondary device including the amount of power required by the actual load and any friendly parasitic load of the secondary device/host object.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of controlling inductive power transfer in an inductive power transfer system from a primary device to a secondary device, the method comprising:
   measuring a characteristic of power in the secondary device, wherein the inductive power is received inductively from the primary device;
   generating secondary device information, wherein the second device information is representative of a measured characteristic of the power in the secondary device and a parasitic load of the secondary device; and
   transmitting the secondary device information to the primary device.

2. The method of claim 1 further comprising:
   receiving, in the primary device, the secondary device information from the secondary device;
   measuring, in the primary device, a characteristic of power drawn from the primary device;
   determining a foreign object is present proximate to the primary device based on a measured characteristic of power drawn from primary device and the secondary device information that is representative of the measured characteristic of the power in the secondary device and the parasitic load of the secondary device; and
   following such determination, restricting or stopping the inductive power transfer.

3. The method of claim 1, wherein the measured characteristic of the power in the secondary device is at least one of a current and a voltage supplied to a load of the secondary device.

4. The method of claim 1, wherein the secondary device information represents an amount of power used by the secondary device.

5. A secondary device for receiving power inductively from a primary device, the secondary device comprising:
   a secondary receiver, wherein the secondary receiver is adapted to couple inductively with a primary transmitter of the primary device when in proximity to the primary device such that power is received inductively by the secondary device from the primary device;
   a measuring circuit, wherein the measuring circuit is arranged to measure a characteristic of power in the secondary device; and
   a communication circuitry,
   wherein the communication circuitry is arranged to transmit secondary device information, to the primary device
   wherein the secondary device information is representative of the measured characteristic of the power in the secondary device and a parasitic load of the secondary device.

6. The secondary device of claim 5,
   wherein the secondary device information is a power requirement of the secondary device,
   wherein the secondary device information includes information indicative of the measured characteristic of the power in the secondary device.

7. The secondary device of claim 6, wherein the measured characteristic of the power in the secondary device is at least one of current and voltage supplied to a load of the secondary device.

8. The secondary device of claim 5, wherein the communication circuitry employs a dummy load to communicate the secondary device information.

9. The secondary device of claim 5, wherein the secondary device information is representative of a sum of the measured characteristic of the power in the secondary device and the parasitic load of the secondary device.

10. The secondary device of claim 5, wherein the secondary device information represents an amount of power used by the secondary device.

11. The secondary device of claim 10, wherein the secondary device information represents a sum of a measured secondary power and the parasitic load of the secondary device.

12. The secondary device of claim 5,
wherein the secondary device transmits the secondary device information to the primary device using a communication link,
wherein the communication link is separate from an inductive power transfer link,
wherein the inductive power link is between the primary device and the secondary device concerned.

13. The secondary device of claim 5, wherein the secondary device transmits the secondary device information to the primary device by varying a load imposed by the secondary device on the primary device.

14. The secondary device of claim 13, wherein the load is varied to amplitude modulate or to pulse width modulate transmission of the secondary device information to the primary device.

15. The secondary device of claim 14, wherein the secondary device information is transmitted as a series of bits or symbols.

16. The secondary device of claim 13, wherein the load is a dummy load.

17. An inductive power supply comprising:
a primary circuitry, wherein the primary circuitry is arranged to transmit power wirelessly to a secondary device, wherein the secondary device is separable from the primary circuitry;
sensor circuitry, wherein the sensor circuitry is configured to measure a characteristic of power in the inductive power supply;
communication circuitry,
wherein the communication circuitry is arranged to receive secondary device information from the secondary device,
wherein the secondary device information is representative of a measured characteristic of power in the secondary device and a parasitic load of the secondary device; and
a controller circuit,
wherein the controller circuit is arranged to determine if there is a substantial difference between the measured characteristic of power in the inductive power supply and a value determined from the secondary device information,
wherein the controller is arranged, to restrict or stop transmitting power wirelessly from the primary circuitry following a determination of the substantial difference.

18. The inductive power supply of claim 17, wherein the secondary device information pertains to a voltage or a current supplied to a load of the secondary device.

19. The inductive power supply of claim 17,
wherein the secondary device information is power requirement information,
wherein the power requirement information includes an amount of power supplied to the secondary device from the inductive power supply.

20. The inductive power supply of claim 17, wherein the sensor circuitry is operable to measure a power drawn from the primary circuitry.

* * * * *